(12) United States Patent
Roddis

(10) Patent No.: US 7,722,050 B2
(45) Date of Patent: May 25, 2010

(54) MECHANICAL SEAL BEARING PROTECTOR

(75) Inventor: Alan Roddis, Sheffield (GB)

(73) Assignee: AES Engineering Limited, Rotherham (GB)

( * ) Notice: Subject to any disclaimer, the term of this patent is extended or adjusted under 35 U.S.C. 154(b) by 0 days.

(21) Appl. No.: 10/520,688

(22) PCT Filed: Jul. 8, 2003

(86) PCT No.: PCT/GB03/02941

§ 371 (c)(1),
(2), (4) Date: Jun. 27, 2005

(87) PCT Pub. No.: WO2004/005770

PCT Pub. Date: Jan. 15, 2004

(65) Prior Publication Data

US 2006/0006602 A1    Jan. 12, 2006

(30) Foreign Application Priority Data

Jul. 8, 2002   (GB)   ................... 0215750.1
Sep. 19, 2002  (GB)   ................... 0221729.7

(51) Int. Cl.
*F16J 15/54* (2006.01)

(52) U.S. Cl. ..................................... 277/378

(58) Field of Classification Search .......... 277/358, 277/361–365, 370–371, 377–378
See application file for complete search history.

(56) References Cited

U.S. PATENT DOCUMENTS

| | | | | |
|---|---|---|---|---|
| 3,314,680 | A | * | 4/1967 | Lagasse et al. ............... 277/369 |
| 3,379,443 | A | * | 4/1968 | Park et al. .................... 277/369 |
| 4,795,168 | A | | 1/1989 | Adams et al. |
| 5,064,205 | A | * | 11/1991 | Whitford ..................... 277/317 |
| 5,078,411 | A | | 1/1992 | Geco |
| 5,161,804 | A | * | 11/1992 | Orlowski et al. ............. 277/378 |
| 5,730,447 | A | * | 3/1998 | Dawson et al. .............. 277/378 |
| 5,865,441 | A | * | 2/1999 | Orlowski ..................... 277/364 |
| 5,924,697 | A | * | 7/1999 | Parker et al. ................ 277/369 |
| 6,109,617 | A | * | 8/2000 | Laney .......................... 277/369 |
| 6,805,358 | B2 | * | 10/2004 | Dawson et al. .............. 277/421 |

FOREIGN PATENT DOCUMENTS

EP          0 105 616 A2    4/1984

* cited by examiner

*Primary Examiner*—Vishal Patel
(74) *Attorney, Agent, or Firm*—Edwin D. Schindler

(57) ABSTRACT

A mechanical seal has an axially floating seal face (21) in sliding contact with an axially stationary seal face (22). A biasing means (33), such as a magnet, biases the floating seal face towards the stationary seal face. The axially floating seal face and the biasing means are rotationally fixed relative to each other and the axially stationary seal face is free to rotate relative to the axially floating seal face. The seal may be used, for instance, as a bearing protector or isolator.

9 Claims, 33 Drawing Sheets

SECTION A-A

SECTION A-A
ALTERNATIVE OPTION OF FIG. 6A

VIEW ON AREA ARROW "A"

MECHANICAL SEAL BEARING PROTECTOR

CROSS REFERENCE TO PRIOR APPLICATION

This is a U.S. national phase application under 35 U.S.C. §371 of International Patent Application No. PCT/GB2003/002941, filed Jul. 8, 2003, and claims benefit of Great Britain Patent Application No. 0215750.1, filed Jul. 8, 2002 and Great Britain Patent Application No. 0221729.7, filed Sep. 19, 2002, both of which are incorporated by reference herein. The International Application was published in English on Jan. 15, 2004 as WO 2004/005770 A3 under PCT Article 21(2).

FIELD OF THE INVENTION

This invention relates to rotary seals and is concerned with their use in rotating equipment and especially devices which prevent the ingress of a fluid or solid to an area which results in deterioration of equipment life. Such devices are often referred to as bearing protectors or bearing isolators. However, the use of such rotary seals extends well beyond the protection of a bearing in rotating equipment. Accordingly, while reference will be made below to bearing protectors, it should be understood that this term is used, as far as the invention is concerned, in connection with mechanical seals having wider uses.

BACKGROUND TO THE INVENTION

The purpose of a bearing protector is to prevent the ingress of fluid, solids and/or debris entering a bearing arrangement and thereby prevent the failure of the bearing. Bearing protectors generally fall into two categories: repeller or labyrinth bearing protectors; and mechanical seal bearing protectors.

A repeller bearing protector includes a component which is mounted for rotation about a shaft and axially fixed in relation thereto. For example, the shaft may be that of a pump or other piece of rotating equipment. The protector includes a static component which is also axially fixed and is butted or secured to the stationary part of the equipment.

The rotating component typically has a complex outer profile which is located adjacent to an inner complex profile of the stationary component. Together these complex profiles provide a tortuous path preventing the passage of the unwanted materials.

A repeller bearing protector normally works only during the operation of the equipment. When the equipment is static, the complex labyrinth design is unable to hold a fluid level which, in horizontal application, is at a higher radial level than the inlet position of the protector.

A mechanical seal bearing protector overcomes the static limitations of the labyrinth design by the use of two opposing seal faces. Such a protector includes a "floating" component which is mounted for axial movement about the rotary shaft of; for example, a pump and a "static" component which is axially fixed and is typically secured to a housing. The floating component has a flat annular end seal face which is directed towards a corresponding seal face of the static component. The floating component is urged towards the static component to close the seal faces together to form a sliding face seal, usually by means of one or more spring members. The rotating component, which in practice could be either the floating or the static component, is referred to as the rotary component. The other component does not rotate and is referred to as the stationary component. A rotary seal is one whose floating component is rotary and, in a stationary seal, the floating component is stationary. If the sliding seal between the rotary and the stationary components is assembled and pre-set prior to despatch from the manufacturer, the seal is termed a "cartridge seal". If the rotary and the stationary components are despatched in unassembled condition by the manufacturer, the seal is termed a "component seal".

Mechanical seals are used in all types of industries to seal a variety of different process media and operating conditions. The term "inboard" defines the area adjacent to the process media and the term "outboard" defines the area adjacent the atmospheric side.

Desirably, a mechanical seal bearing protector prevents the ingress of fluid etc. irrespective of the direction of shaft rotation. Furthermore, it is also desirable that the bearing protector does not generate a spark during dynamic operation.

Bearing protectors are generally very compact at least as far as their axial length is concerned. Typically they are used to replace so-called lip seals and are fitted into spaces previously occupied by such seals. In order to maintain a compact axial length, the floating component may be energised by one or more magnets in either attracting mode (U.S. Pat. No. 5,078,411 Geco) or repelling mode (EP-0105616 Burles).

Geco discloses a rotary component seal which has a magnetic stationary member and a rotary member with more than one magnet spaced around the periphery of the component. The rotary and stationary members are attracted to one another by the magnetic force. The stationary seal face is limited to a magnetic material and is adjacent to the sealing surface in contact with the sealed medium. Accordingly, metallic particles in the sealed medium are attracted to the seal face. Soft seal faces such as carbon can, as a result, be easily damaged. Furthermore, the strength of attraction between the relatively rotating members is limited to the axial extent of non-magnetic material between the two magnets. If the distance is too large, the magnetic attraction will be sufficient to hold the seal faces together. If the distance is too small, flux migration can occur.

U.S. Pat. No. 4,795,168 (Adams et al) shows another configuration in which two relatively rotating seal faces are attracted to one another by a magnetic force. This arrangement is also vulnerable to flux migration between the two relatively rotating members.

U.S. Pat. No. 5,730,447 (Dawson et al) again discloses a rotary component seal having a magnetic stationary member and a rotary member with magnetic elements spaced around the periphery of the component. Again the arrangement is vulnerable to flux migration between the two relatively rotating members. Buries discloses two mechanical seal faces whose relative axial position is maintained by at least one set of repelling magnets which replace a conventional compression spring. The repelling forces act to separate stationary members, one of which is fixed to, for instance, the housing of the equipment and the other of which is axially floating. Such an arrangement, requiring both fixed and floating stationary members is not appropriate for bearing protectors.

STATEMENTS OF THE INVENTION

According to the present invention there is provided a mechanical seal having an axially floating seal face in sliding contact with an axially stationary seal face, and means for biasing said floating seal face towards said stationary seal face, said axially floating seal face and said biasing means being rotationally fixed relative to each other and said axially stationary seal face being free to rotate relative to said axially floating seal face.

Preferably the biasing means is in the form of one or more magnets. Although reference is often made herein below to a magnet it should be understood that a plurality of magnets may be provided. Furthermore, a magnet may be replaced either wholly or partially by another biasing member, for instance, some form of mechanical biasing means such as a spring or resilient elastomeric member including a bellows-like arrangement.

Preferably the magnet is arranged within the seal such that, in use, it is non-rotating. Preferably the magnet is mounted in a non-rotating housing and forms part of the seal.

Preferably the magnet is mounted radially outwards of said seal face. Preferably the seal includes a magnetically insulating member located between the magnet and the axially stationary seal face.

The seal preferably includes a housing which has at least one radially outwardly positioned equipment chamber location feature. Said location feature is located adjacent to a radially extending groove which contains at least one elastomeric member for sealing the housing to the equipment chamber. There may be at least two radially outwardly positioned equipment chamber location features, with correspondingly at least two radially extending grooves, both of which containing at least one elastomeric member for sealing the housing to the equipment chamber.

Preferably the two location feature are radially and/or axially displaced relative to each other.

Preferably the seal includes a housing which is provided with a radially extending hole connecting the outermost and innermost surfaces of the housing.

Preferably at least one of the seal faces is segmented.

A seal in accordance with the present invention may include two substantially identical pairs of contacting seal faces which may be in a modular form.

A rotating member of the seal of the invention may include at least one non-continuous, circumferentially and radially extending portion.

Preferably a seal of the invention may include at least one magnetic member which is radially restrained in the housing by a groove and free to be positioned at any angular displacement.

A seal of the invention may include at least one housing which is magnetic. A mechanical seal of the invention may contain at least two seal faces, axially restrained in a housing, the first seal face having the ability to rotate with a shaft or other item of rotating equipment, and the second seal face being non-rotatable with respect to the housing of the rotation equipment.

A mechanical seal of the invention may have at least three seal faces, axially restrained in a housing, the first seal face having the ability to rotate with a shaft or other item of rotating equipment, and the second and third seal faces being non-rotatable with respect to the housing of the rotating equipment.

A mechanical seal of the invention may have at least one symmetrical seal face when viewed at approximately 90° to a shaft to which the mechanical seal is fitted. Such a seal face may be removed from the mechanical seal and rotated through 180°, thereby creating a new sliding surface which corresponds to at least one seal face prior to rotation.

A seal face of the invention may include an angular spacing member, which is positioned adjacent to at least one magnetic member.

Embodiments of mechanical seals in accordance with the present invention may be such that at least one rotary member and/or one stationary member can be mechanically attached to the items of rotary equipment.

A seal of the invention may include a housing having at least one axial through hole or slot for accommodating a stud or bolt in an item of rotating equipment, thereby allowing the housing of the mechanical seal to be secured to the rotating equipment.

Preferably the seal of the invention includes at least two counter-opposed magnetic members, said first magnetic member attracting a first axially floating seal face and a second magnetic member attracting a second axially floating seal face.

Preferably a seal of the invention includes lubrication means for feeding lubricant to the contacting seal faces. A cavity may be provided between at least two sets of sliding surfaces and said cavity may be connected to the lubrication means which acts automatically to fill the cavity with lubrication fluid.

A seal of the invention may be a double mechanical seal of a size small enough to fit in a space having a radial cross section up to 5 mm. A double mechanical seal in accordance with the present invention may be small enough to fit in a space having an axial dimension up to 6 mm.

A seal of the invention may include a housing having in its outer radial surface a radial indentation providing pressure relief within the seal. The radial indentation may extend the length of the outer housing and/or the length of the outer housing to a radially extending shoulder whereby said indentation connects one axial side of an outer elastomer groove to said radial shoulder.

The radial indentation may be in the form of a spiral which axially connects one axial face to a second axial face. The second axial face may be axially disposed to the first and adjacent to a radially displaced groove which contains an outer elastomer, said elastomer providing a tight radial squeeze.

The invention also provides a bearing protector in the form of a mechanical seal which is of the invention.

DESCRIPTION OF THE DRAWINGS

The accompanying drawings are as follows:

FIG. 6AB is a section on line AA of FIG. 6AA;

DETAILED DESCRIPTION OF THE INVENTION

The invention will now be described, by way of examples only, with reference to the accompanying drawings.

In general rotary seals in accordance with the present invention may be used not only in the case where the shaft is a rotary member and the housing is a stationary member but also the reverse situation, that is to say, in which the shaft is stationary and the housing is rotary.

Furthermore, the invention may be embodied in both rotary and stationary arrangements, cartridge and component seals with metallic components as well as non-metallic components.

Figure 1:
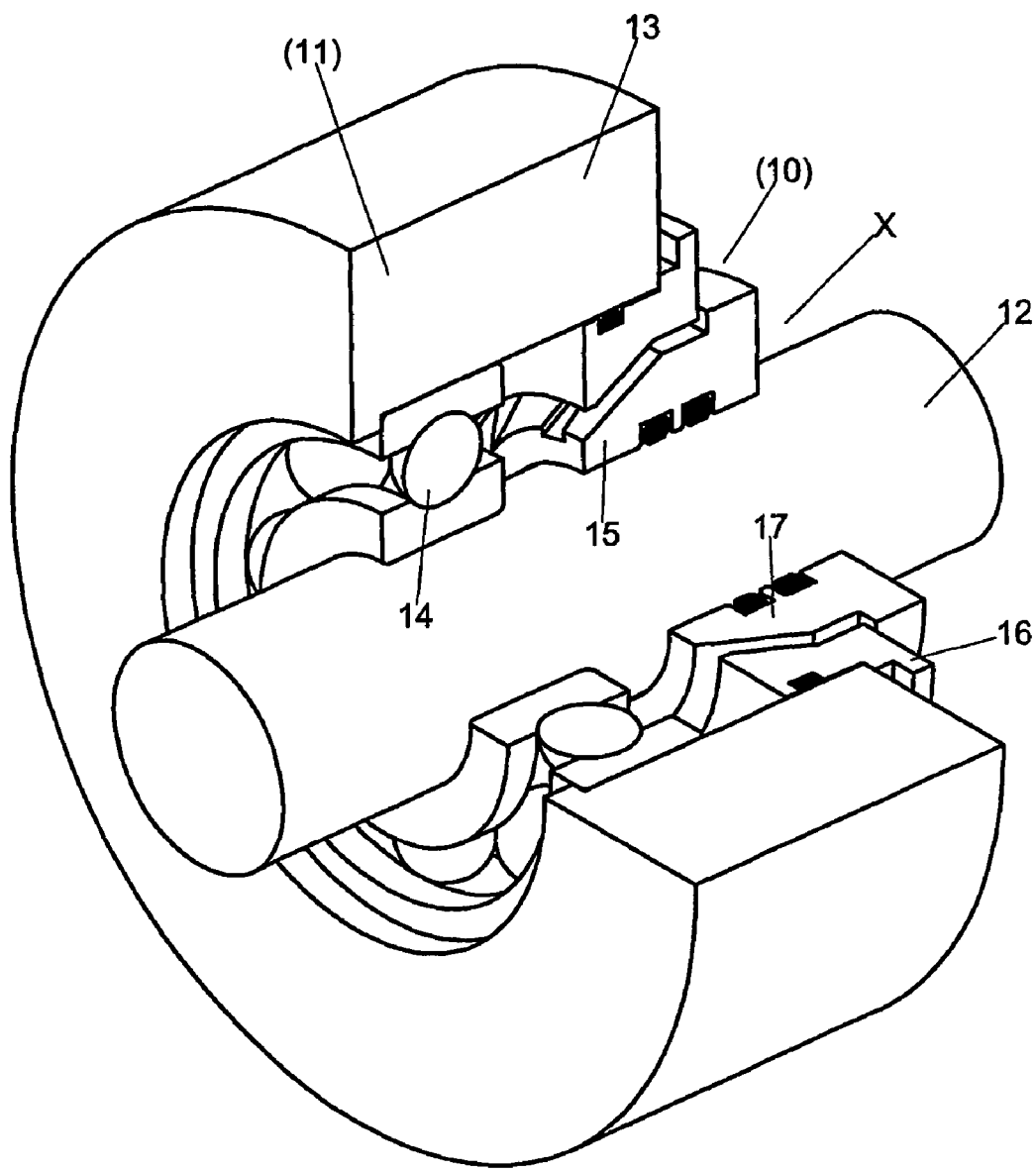
FIG. 1 is a quarter cutaway of an isometric view of a repelling bearing protector mounted on a shaft and including an integral bearing.

Referring to FIG. 1 of the accompanying drawings, there is illustrated a repelling bearing protector assembly 10 which is fitted to an item of rotating equipment 11. The equipment includes a rotating shaft 12 and a stationary housing 13. The stationary housing 13 contains a bearing 14.

Area X at the opposite end of the bearing isolator assembly 10 to the bearing 14 partially contains fluid and/or solids and/or foreign debris, the term "product substance" being used to describe the single or mixed medium.

The repeller bearing protector assembly 10 includes a rotary member 15 which is positioned adjacent a stationary member 16. A static leak path 17 lies between these components when the equipment is not rotating. In slow shaft speed applications, such as mixing and agitating application, the repelling action is insufficient to repel fluid since the peripheral speed is too low.

Figure 2:
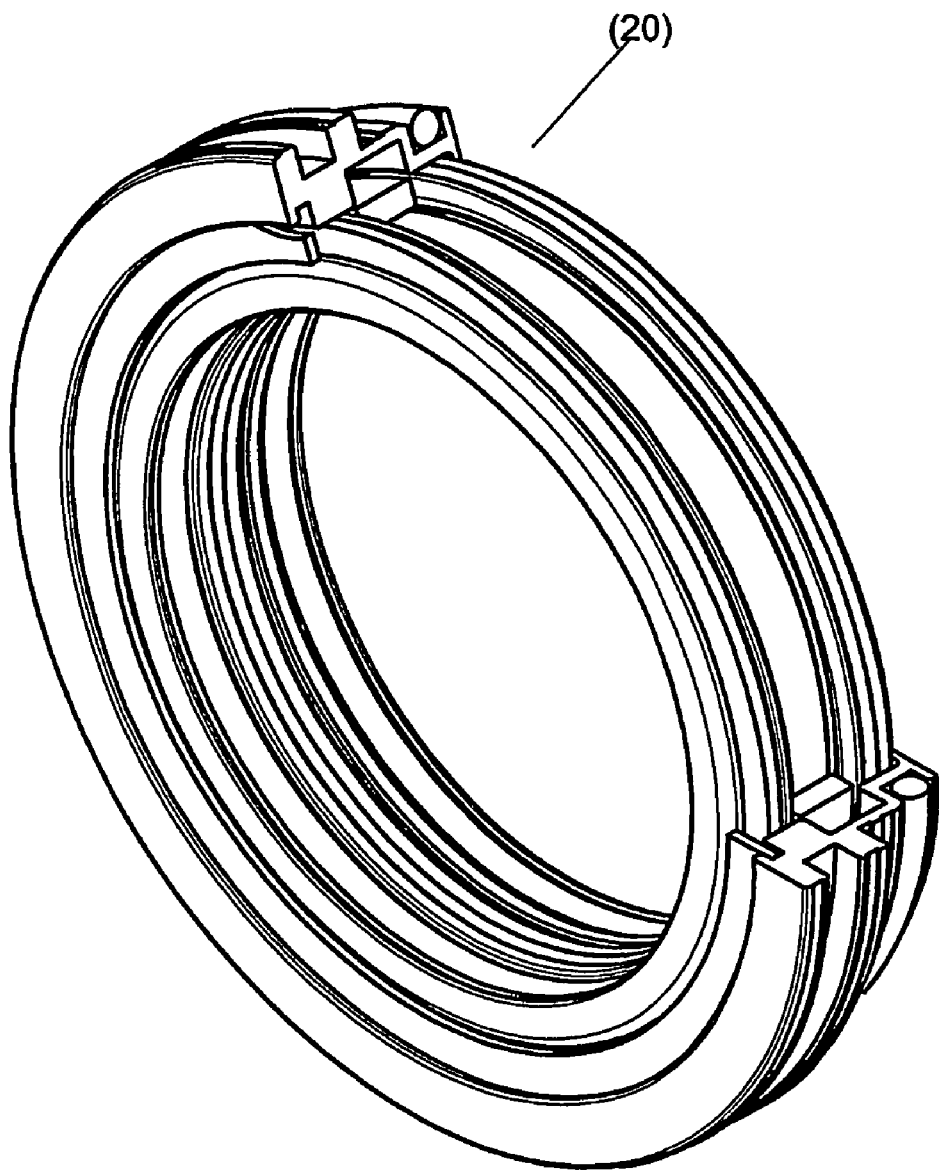
FIG. 2 is a quarter cutaway of an isometric view of a first embodiment bearing protector of the invention.
Figure 3:
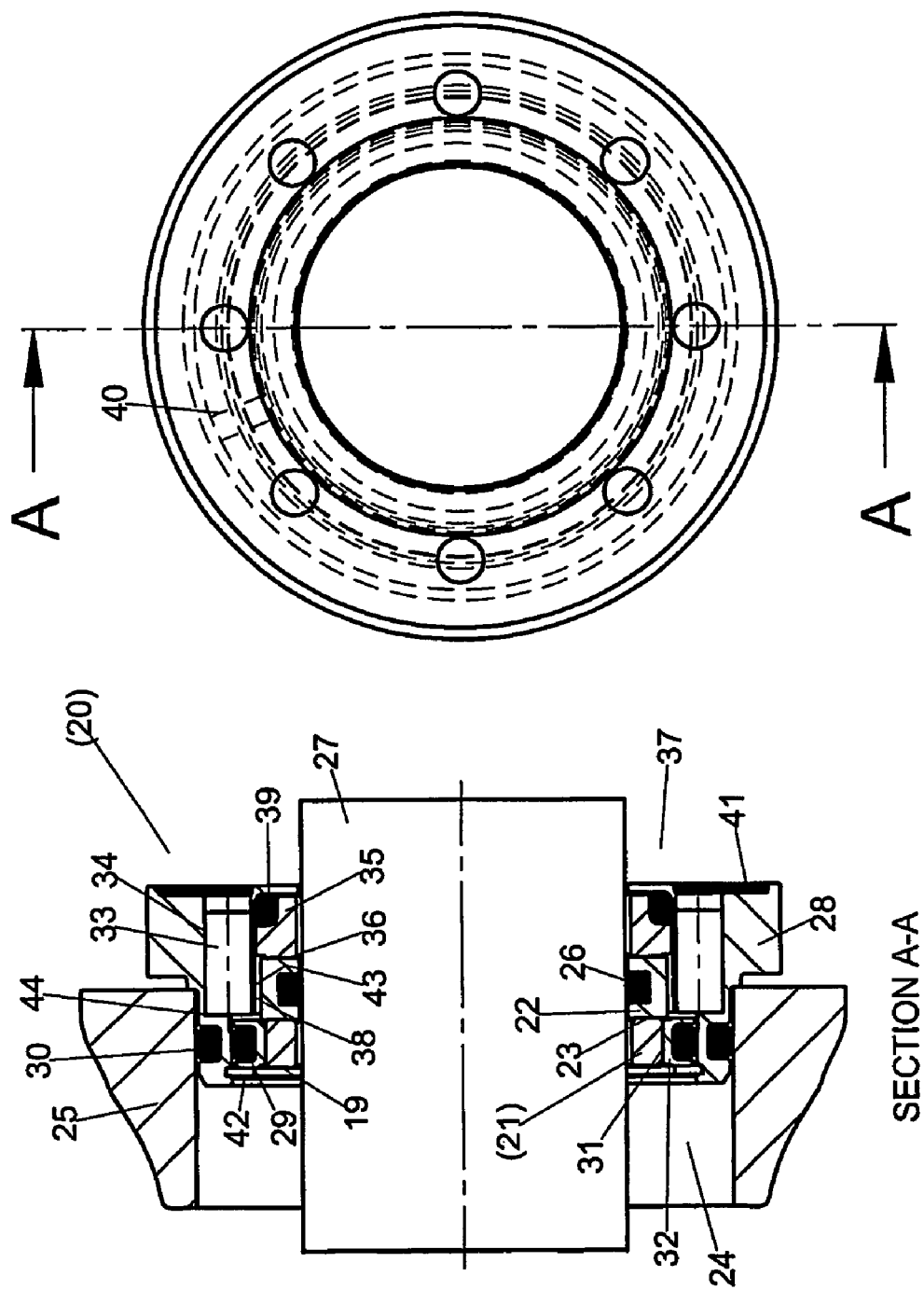
FIG. 3A is an end view of the bearing protector of FIG. 2.
FIG. 3B is longitudinal cross-section taken on line AA of FIG. 3B.

Referring to FIGS. 2 and 3 of the accompanying drawings, a first embodiment of the bearing protector 20 of the invention is in the form of a double cartridge mechanical seal which includes a stationary and axially floating seal face assembly 21 which is magnetically spring biased towards a static rotary seal face 22. Rotary seal face 22 slides on static seal face 21, the interface between the seal faces forming a sealing area 23. This sealing area 23 is the primary seal that prevents fluid medium 24 from escaping from the bearing chamber 25.

Fluid medium 24 is also sealed by a rotary elastomer 26 which contacts shaft 27, thereby forming a first secondary sealing area A second secondary sealing area is formed between stationary seal face 21 and stationary housing 28 by means of elastomeric member 29. A third secondary sealing area is formed between the stationary housing 28 and the bearing chamber 25 by means of elastomeric member 30.

The primary and secondary sealing areas prevent the fluid medium 24 from escaping from the bearing chamber 25.

The static seal face 21 is prevented from rotating by radial squeeze between the elastomeric member 29 and the housing 28. In other embodiments, alternative anti-rotation arrangements may be provided.

The rotary seal face 22 rotates with the shaft 27 due to radial squeeze between the elastomeric member 26 and the shaft 22. Again, alternative rotational drive devices can be utilised in other embodiments of the invention.

Stationary seal face 21 is a shrink fitted, two part design. A first, radially inward part is a seal running face 31 which is typically manufactured from a mechanical seal face material such as carbon, tungsten carbide, silicon carbide or a ceramic material.

The second radially outward part of the seal face 21 is a seal face holder 32 which is manufactured from a magnetic material. The interface between the seal face holder 32 and the seal running face 31 is preferably sealed by means of a suitable adhesive.

The two part stationary seal face 21 is axially attracted to the housing 28 by magnets 33. These magnets 33 are each in the form of a cylindrical bar magnet located in holes 34 equally spaced around the housing 28. In other embodiments, magnets of different shapes and sizes may be employed.

The magnets 33 are preferably sealed into their corresponding holes 34 by means of a suitable adhesive.

Located on the other side of rotary seal face 22 to stationary seal face 21 is a static seal face 35. The magnets 33 also attract rotary seal face 22 towards the static seal face 35 and the rotary seal face 22 slides on the static seal face 35. The interface between rotary seal face 22 and stationary seal face 35 provides sealing area 36 which is the primary seal that prevents the fluid media 37 from entering into the bearing protector chamber 38.

A fourth secondary sealing area, preventing fluid medium 37 from entering bearing protector chamber 38, is provided between stationary seal face 35 and stationary housing 28 by means of elastomeric member 39.

Housing 28 is provided with at least one radially extending hole 40 connecting the outermost and innermost regions of the housing. The hole 40 enables an assembly fluid to enter the bearing protector chamber 38 helping to lubricate the seal surfaces 23 and 36. The assembly fluid is preferably unpressurised and may be a solid grease which becomes liquid as a result of heat transferred from the mechanical seal faces.

In some applications, particularly low shaft speed applications, an assembly fluid may not be required and the hole 40 may be omitted. Where hole 40 is included it is preferably blocked after the assembly fluid is inserted into chamber 38. However, since the radial gap is relatively small between the outermost surface of housing 28 and the bearing housing 25, leaving hole 40 unblocked could be used to provide an early warning system, detecting a leaking inboard seal face.

If the seal surface 23 becomes damaged, fluid 24 will pass into the bearing protector chamber 38. Over a period of time, this fluid will fill chamber 38 and then escape, in a controlled manner, via hole 40. Accordingly, the observation of escaping fluid 24 from hole 40 would give an early indication of the failure of seal face 23 prior to the second seal face 36 failing. Such an early warning is of great value to the user, giving him valuable time to stop the rotating equipment and repair the seal face 23 before catastrophic equipment failure occurs.

The end of magnet 33 which is opposite elastomeric members 29 and 30 is covered by an adhesive backed gasket 41. Gasket 41 prevents fluid 37 from contacting the back of the magnet 33. While gasket 41 is not essential it is of additional value in the case where the bearing protector is reversed and possibly clamped in place, since it can then be used to seal the bearing protector to the bearing chamber 25.

At the inboard side of the beating protector 20, circlip 42 prevents the stationary seal face assembly 21 from being dislodged when the bearing protector 20 is removed from the shaft 27.

Known mechanical seal bearing protectors typically have one set of seal faces. Should either of these seal faces be damaged, the bearing protector will be unable to seal fluid media. This could result in damage to the rotating equipment. The bearing protector of the invention, as illustrated in FIGS. 2 and 3, has two sets of seal faces. This increases the probability that the bearing protector will last longer than known designs.

Stationary seal face assembly 21 is symmetrical about an axis which is 90° from the axis of shaft 27. This allows the user to install a third seal face during an emergency breakdown or other unplanned event. In practice, should both seal face sliding surfaces 23 and 36 be damaged during operation, it is likely that the seal face with a smaller radial cross-sectional running face will be damaged. This is because the seal faces 31 and 35 are normally manufactured from relatively soft materials such as carbon. Since the stationary seal assembly 21 is symmetrical, the user can then install the previously unused seal face 19.

In order to install seal face 19, circlip 42 is removed, the stationary seal face assembly 21 is rotated by 180° in a plane which is 90° to the axis of shaft 27. Once the circlip 42 is re-fitted, the bearing protector 20 can be put back into service until such time as it may be fully refurbished or replaced.

Figure 4:
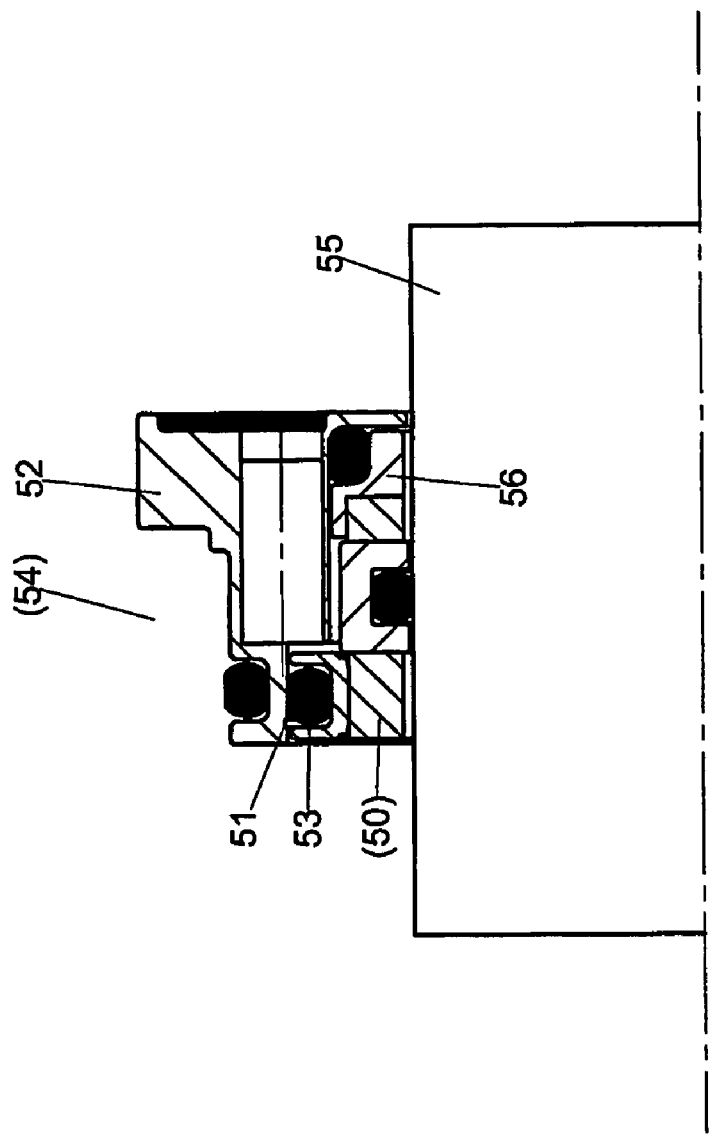
FIG. 4 is a partial longitudinal cross-section through a second embodiment of a bearing protector of the invention.

Referring to FIG. 4 of the accompanying drawings, there is illustrated a second embodiment of a bearing protector of the invention having shrink-fitted seal faces and an alternative retention mechanism. This is provided by a radially outwardly extending groove 51 in housing 52. This groove 51 holds elastomer 53 while the bearing protector 54 is being removed from shaft 55.

Figure 5A:
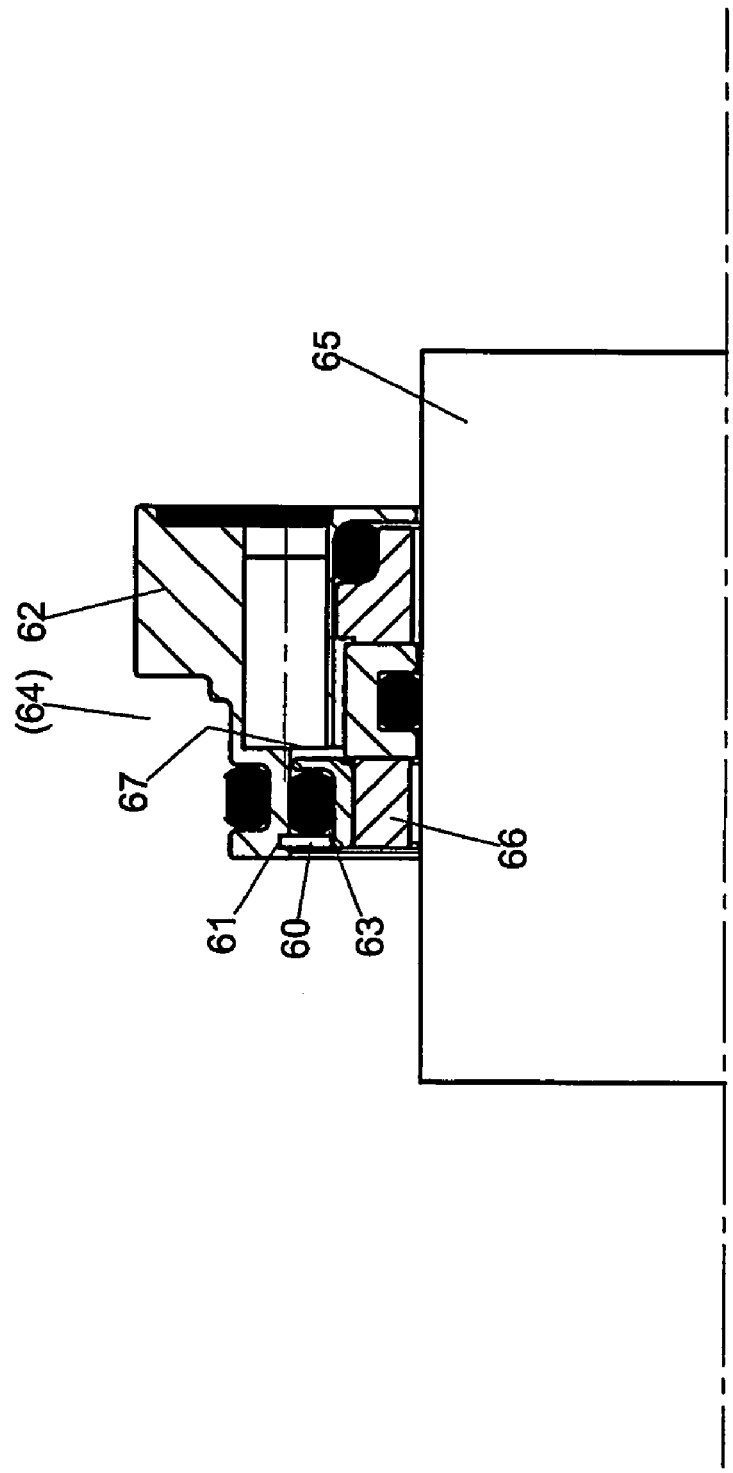
FIG. 5A is a partial longitudinal cross-section through a third embodiment of a bearing protector of the invention.

FIG. 5A shows a third embodiment of a bearing protector of the invention and illustrates an alternative retention device in the form of a circlip 60 fitted in a radially outwardly extending groove 61 in housing 62. Circlip 60 retains elastomer 63 while the bearing protector 64 is being removed from shaft 65.

The inboard stationary seal face assembly 66 includes a radially extending portion adjacent to magnet 67. This allows the circlip 60 to be employed without increasing the inboard length of the bearing protector 64.

Figure 5B:
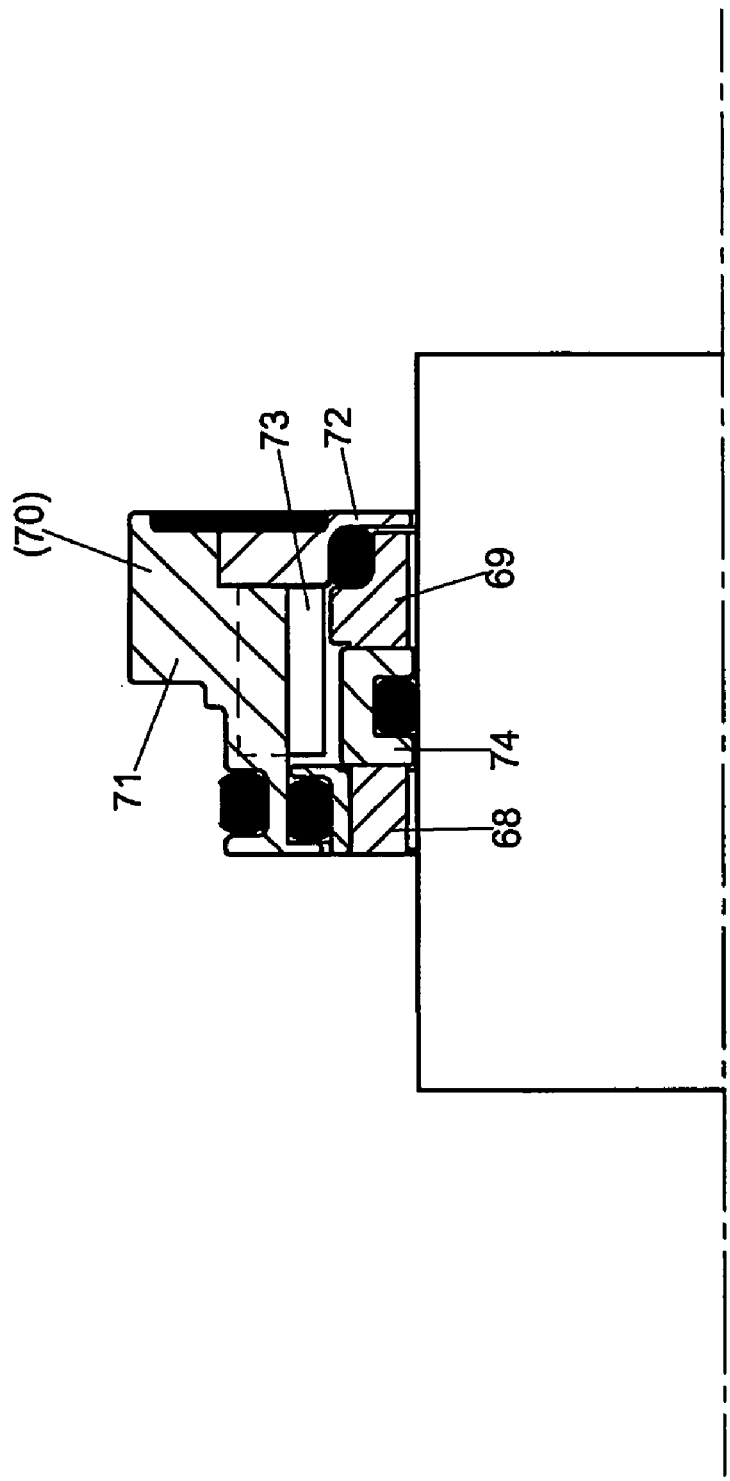
FIG. 5B is a partial longitudinal cross-section through a fourth embodiment of a bearing protector of the invention.

FIG. 5B shows a fourth embodiment of a bearing protector of the invention and in particular another retention arrangement. In this case the housing 70 is in two parts, a main housing 71 and an end cap 72. End cap 72 is attached to main housing 71 either mechanically or chemically/adhesively.

In this case magnet 73 is radially exposed to the rotary seal face 74. If rotary seal face 74 is manufactured from a magnetic material, the effect is to radially centralise the rotary member 74 in the housing assembly 70.

Figure 6A:
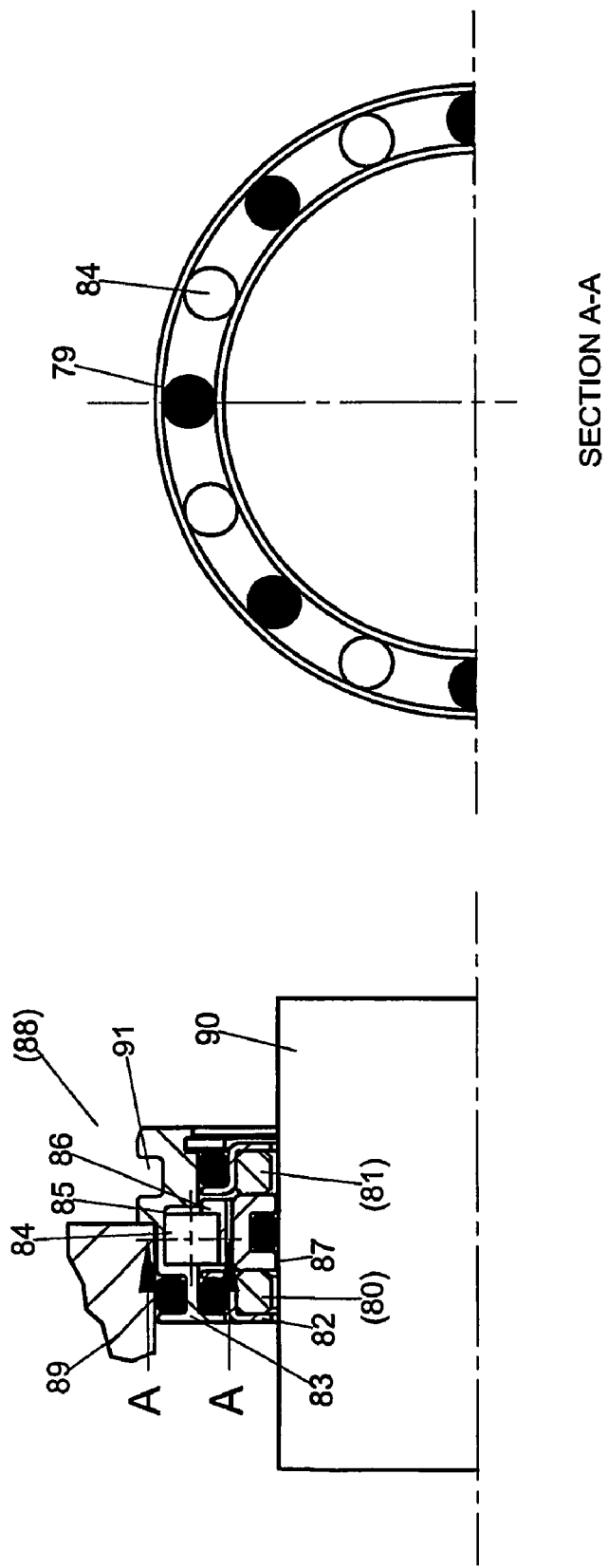
FIG. 6AA is a partial longitudinal cross-section through a fifth embodiment of a bearing protector of the invention.

FIGS. 6AA, 6AB and 6B show a fifth embodiment of the bearing protector of the invention. In this case the inboard 80 and outboard 81 stationary seal face assemblies are modular and identical to one another. This reduces user and supplier inventory costs. The stationary seal face holder 82 is of constant thickness allowing it to be manufactured from sheet steel by means of, for instance, a pressing operation. This again reduces the manufacturing costs.

The inboard stationary seal face assembly 80 is located radially inward of housing 83 and is axially attracted to the cylindrical bar magnets 84 which are contained in groove 85 of housing 83. The magnets are not angularly restrained by housing 83. This allows multiple magnets to be located in groove 85 in order to achieve the desired interface pressure between the seal face 80, 87 and 81, 87. Spaces 79 can be included in the groove 85, as illustrated in FIG. 6AB.

Figure 6B:
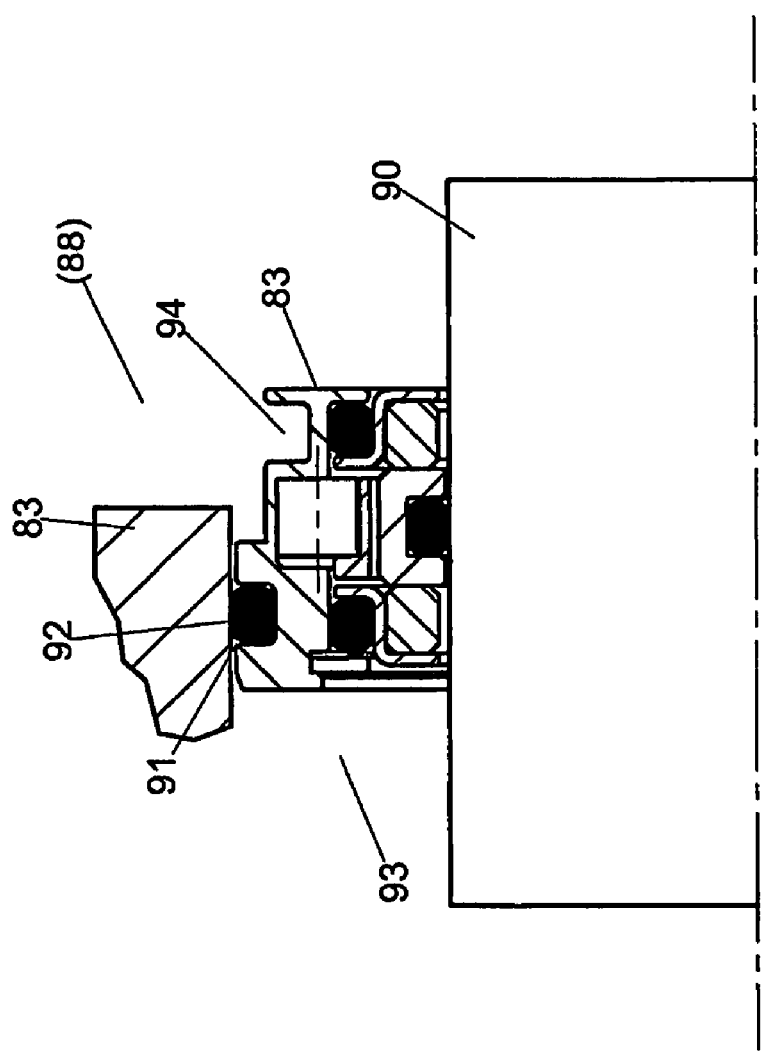
FIG. 6B shows the bearing protector of 6A mounted within a different sized housing.

FIG. 6B shows the bearing protector of FIG. 6AA but located into a different sized housing 83. This is achieved by the use of an elastomeric member 92 located in groove 91 in place of the elastomeric member 94a located in groove 94 in the case of the FIG. 6AA arrangement.

Figure 6C:
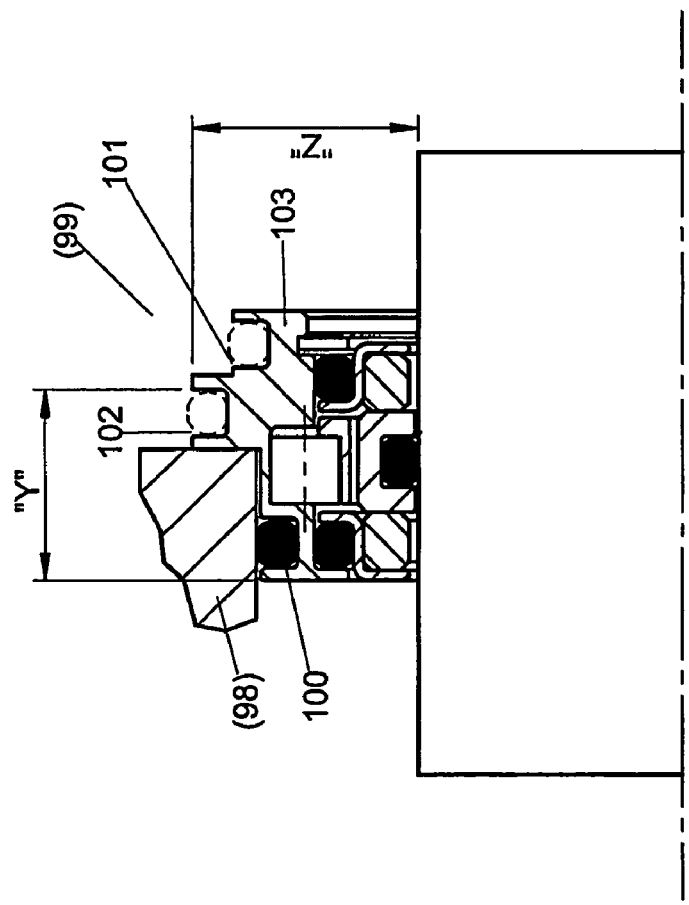
FIG. 6C is a partial longitudinal cross-section showing a sixth embodiment of a bearing protector of the invention.

FIG. 6C shows a sixth embodiment of a bearing protector of the invention. This embodiment is similar to that shown in the FIG. 6 drawing but in this case the protector can locate into three different sized housings. Elastomeric member 100 located in groove 100a allows the bearing protector to be sealed to housing 98. The use of elastomeric members in either groove 101, or groove 102 allows the bearing protector to be located in different sized housings.

Figure 6D:
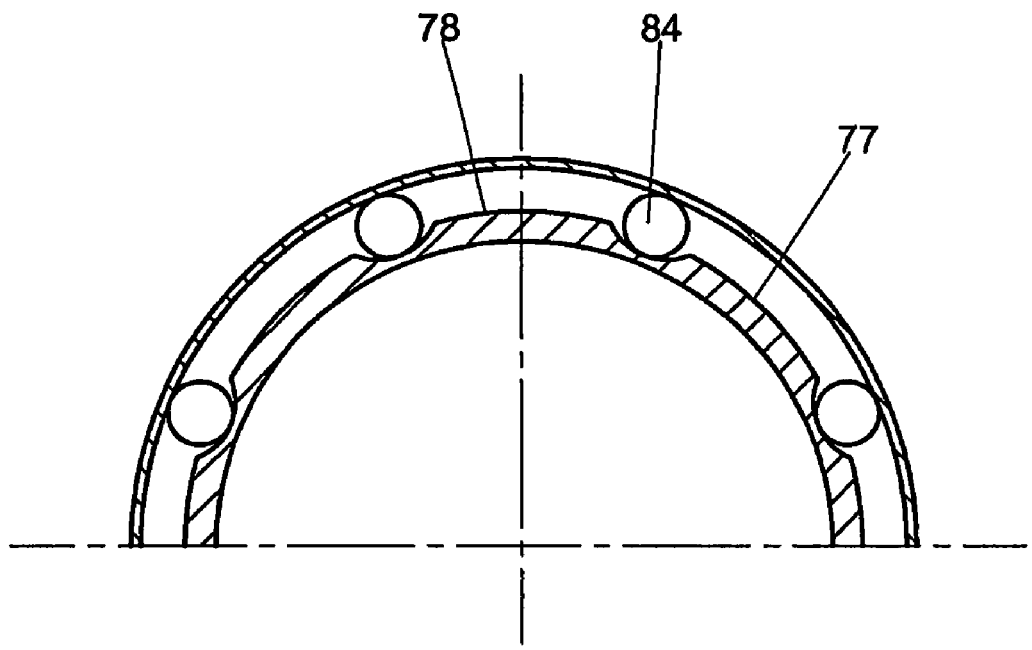
FIG. 6D illustrates an alternative magnet arrangement for a bearing protector of the invention.

FIG. 6D shows an alternative arrangement for locating magnets 84 within a bearing protector of the invention. An insulating sleeve 78 is provided with castellations 77, the number of which correspond to the number of magnets 84. Castellations 78 are equally spaced around the circumference of sleeve 78 and angularly separate the magnets 84. Referring again to FIG. 6AA, magnets 84 are radially supported by insulating sleeve 86 which prevents any radial magnetic attraction from magnets 84 to rotary seal face 87. This reduces the possibility of generating sparks.

Housing 83 is of simple shape and contains no feature which is not rotationally uniform around its circumference. Accordingly, housing 83 can be manufactured by a simple turning operation of a lathe 2 and without any complex and time consuming milling or drilling operation.

Differences in the radial cross-section between the bearing chamber housing 89 and shaft 90 make it difficult for a supplier to offer a comprehensive range of bearing protectors to fit various rotating equipment configurations. In practice, known bearing protectors will fit only a single bearing chamber housing configuration.

Groove 91 of housing 83 may be used not only to accommodate elastomeric member 92 (see FIG. 6B) but may also be used to remove the bearing protector 88 from the beating chamber 89 (FIG. 6AA).

Accordingly, it can be seen from the drawings of FIG. 6 that a bearing protector of the invention may be reversed so that it can be installed in more than one bearing chamber housing configuration. This alone can reduce supplier and customary inventory levels by half. In addition, FIG. 6C illustrates that a bearing protector of the invention is not limited to only two bearing chamber housing configurations. The FIG. 6A embodiment provides a third option. In other embodiments, bearing protectors of the invention may be designed for use for any number of bearing housing configurations.

Referring to FIG. 6C, it is preferred, although not essential, to maintain a 1:1 relationship between the inboard length and the radial distance Z. By way of example, if the radial distance Z is 0.500 units, then the inboard length y should be a maximum of 0.500 units. This ensures that the inboard length y of the bearing protector 99 will always fit into the axial bearing chamber housing 98, since this relationship is typical for lip seals and/or packing which the bearing protector 98 is to replace.

Figure 7B:
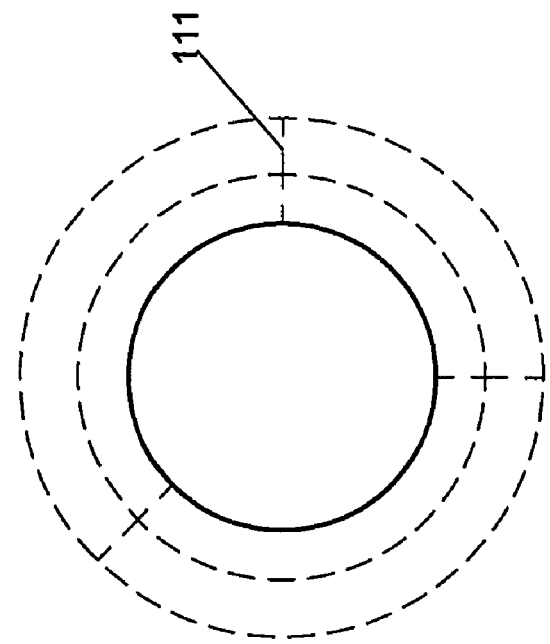
FIG. 7B is an end view on arrow A of the bearing protector of FIG. 7A.
Figure 7A:
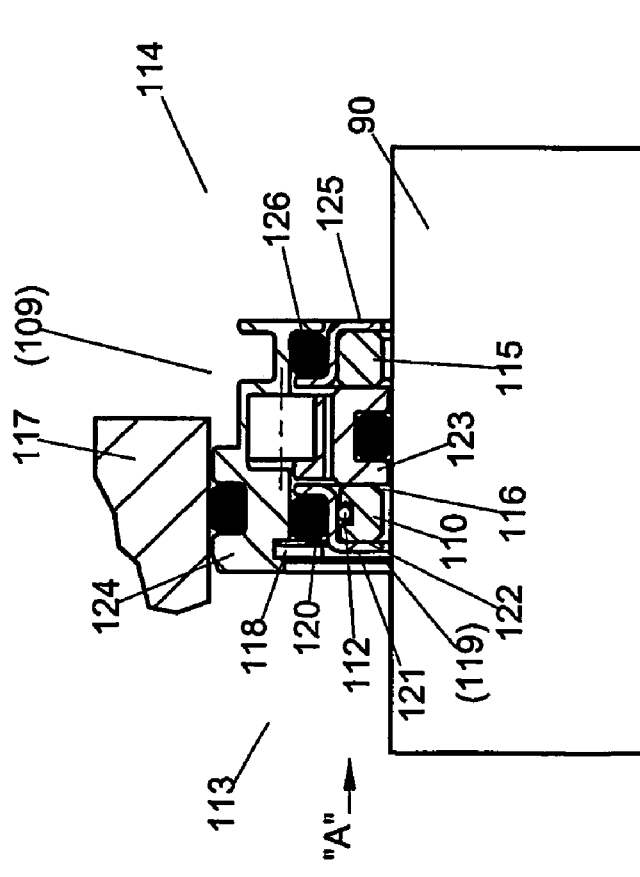
FIG. 7A is a partial longitudinal cross-section through a seventh embodiment of a bearing protector of the invention.

Referring to FIGS. 7A and 7B of the accompanying drawings, a seventh embodiment of a bearing protector 109 of the invention has at least one reversible segmented seal face 110. This seal face 110 is symmetrical about a plane 90° to shaft 90 and is segmented, as indicated at, for instance, 111 of FIG. 76B into more than one part.

A spring or elastomeric member 112 is located in a groove on the outer surface of the segmented seal face 110. This spring 112 supports the segmented parts of seal face 111 with respect to one another. The reversible segmented seal face 110 provides all the benefits of the previously described reversible seal face. In addition the segmentation of the seal face allows the running seal face 116 to be replaced without removing the bearing protector from the shaft 90. This can be accomplished in the following manner. Upon leakage of fluid 113, the bearing protector 109 is removed from the bearing cavity housing 117 but is not removed from the shaft 90. While the bearing protector remains in situ around shaft 90, circlip 118 is removed allowing stationary seal face assembly 119 to be removed with elastomer 120. The segmented seal face 110 may then be removed from the holder 121 and the centralising elastomer 112, allowing each portion of the segmented seal face 110 to be twisted through 180°. This allows the end portion of 122 of segmented seal face 110 to be moved to the running face 116, thereby giving the bearing protector a new, flat seal face which will provide a leak free surface in contact with rotating member 123.

Once all portions of the segmented seal face 110 are reversed into their new position, the elastomeric member 112 can be repositioned around the outermost part of the seal face 110. It is then pushed into the holder 121 making a new stationary seal face assembly 119. The seal face assembly 119 and elastomer 120 may then be repositioned into the housing 124 and the circlip 118 refitted. The bearing protector 109 may then be repositioned back in the bearing cavity housing 117 and the rotating equipment may be restarted. As will be appreciated, it is of considerable advantage that a seal face can be replaced without the bearing protector being removed from the shaft.

Figure 8:
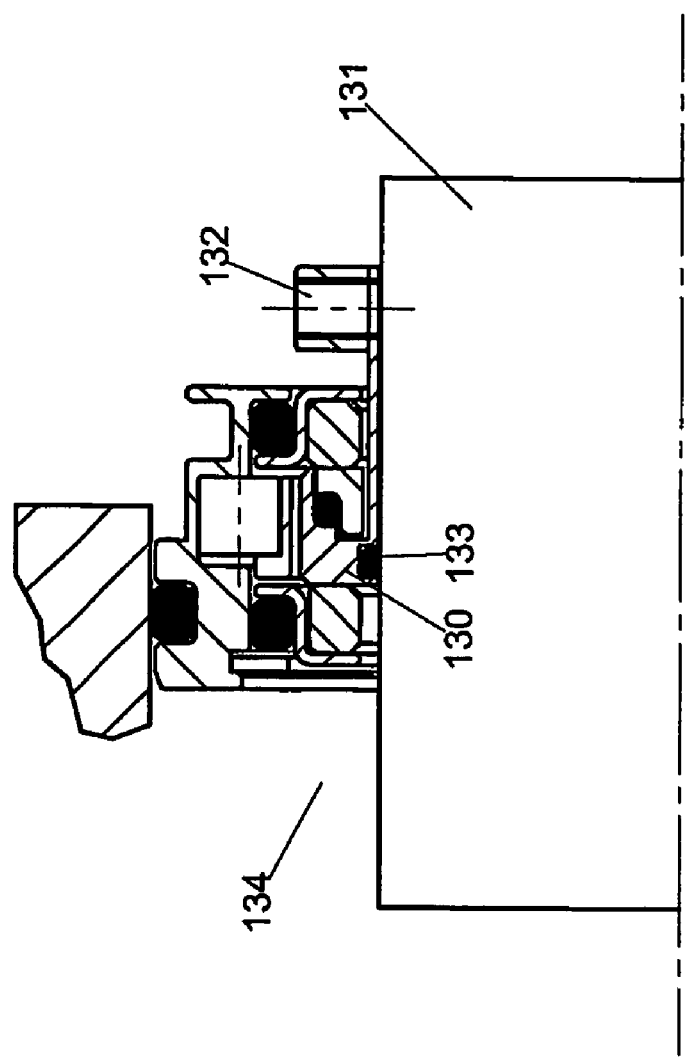
FIG. 8 is a partial longitudinal cross-section through an eighth embodiment of a bearing protector of the invention.

Referring to FIG. 8 of the accompanying drawings, an eighth embodiment of a bearing protector of the invention is such that the rotary member 130 is secured to the shaft 131 by a mechanical arrangement such that the rotary member can be removed and replaced when necessary. The arrangement includes at least one set screw 132 which secures an extension of rotary member 130 to shaft 131. Rotary member 130 is provided with an elastomer 133 which is positioned to prevent the ingress of the fluid 134 between the radially innermost portion of the rotary member 130 and the shaft 131.

It will be appreciated that, in other embodiments, the shaft may be a stationary member while the housing is a rotary member. The bearing protector of the invention will work equally in such an application, the magnetic members simply rotating with the housing. Alternatively the arrangement could be such that a non-rotating assembly could be provided adjacent to the shaft.

Figure 9:
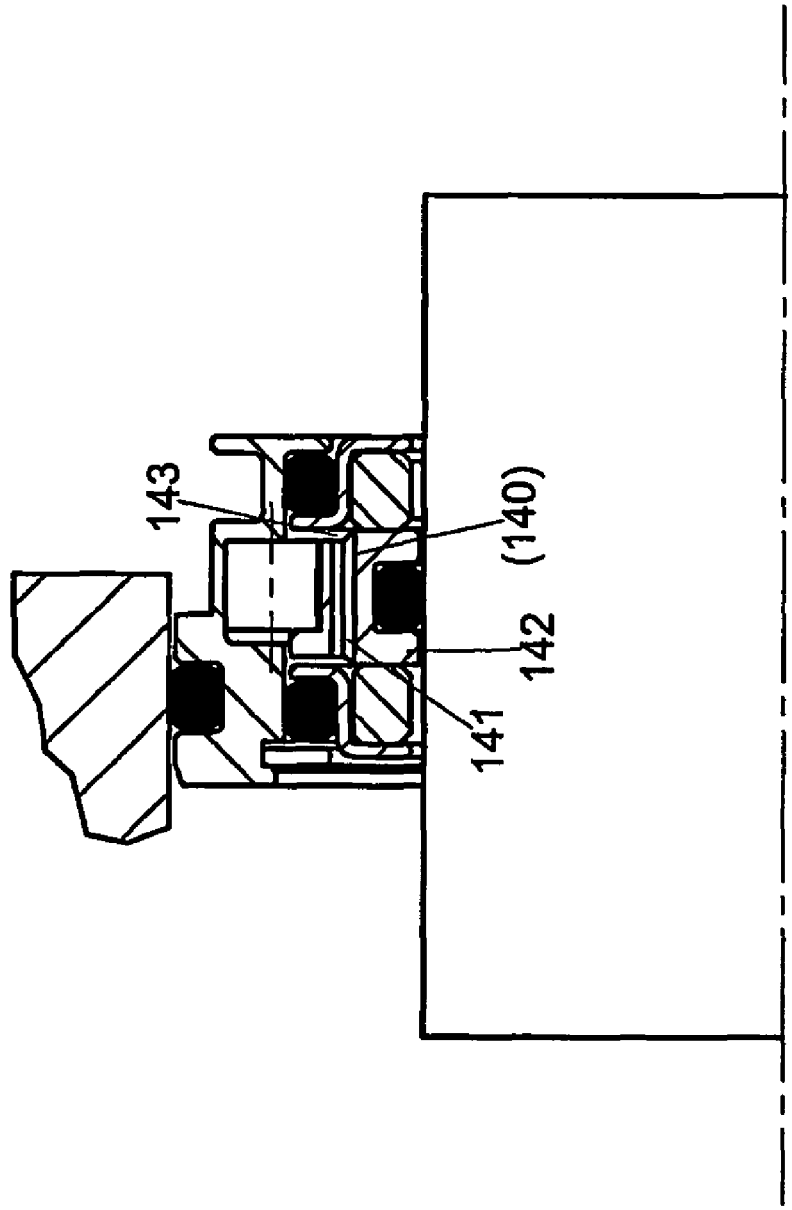
FIG. 9 is a partial longitudinal cross-section through a ninth embodiment of a bearing protector of the invention.

Referring to FIG. 9 of the accompanying drawings, a ninth embodiment of a bearing protector of the invention includes a pumping ring 140 which is integral with the rotating seal face 142. The pumping ring 140 includes at least one radially extending slot 141 and acts to circulate fluid in the bearing protector cavity 143.

Figure 10:
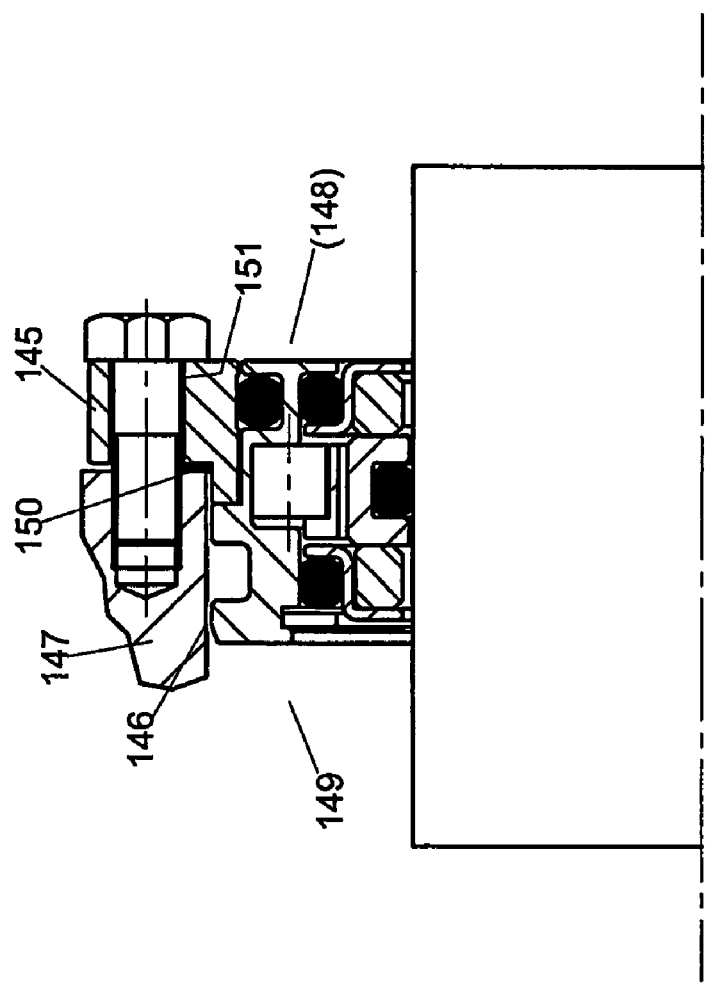
FIG. 10 is a partial longitudinal cross-section through a tenth embodiment of a bearing protector of the invention.

Referring to FIG. 10 of the accompanying drawings, a tenth embodiment of a bearing protector of the invention is shown installed in a gland plate 145. A gland plate may be employed if the innermost radial portion 147 of the bearing chamber housing 147 will not accept the bearing protector 148. Fluid 149 is sealed by a gasket 150. Gland plate 145 is provided with at least one hole 151 which allows it to be secured to the bearing chamber housing 147.

Figure 11:
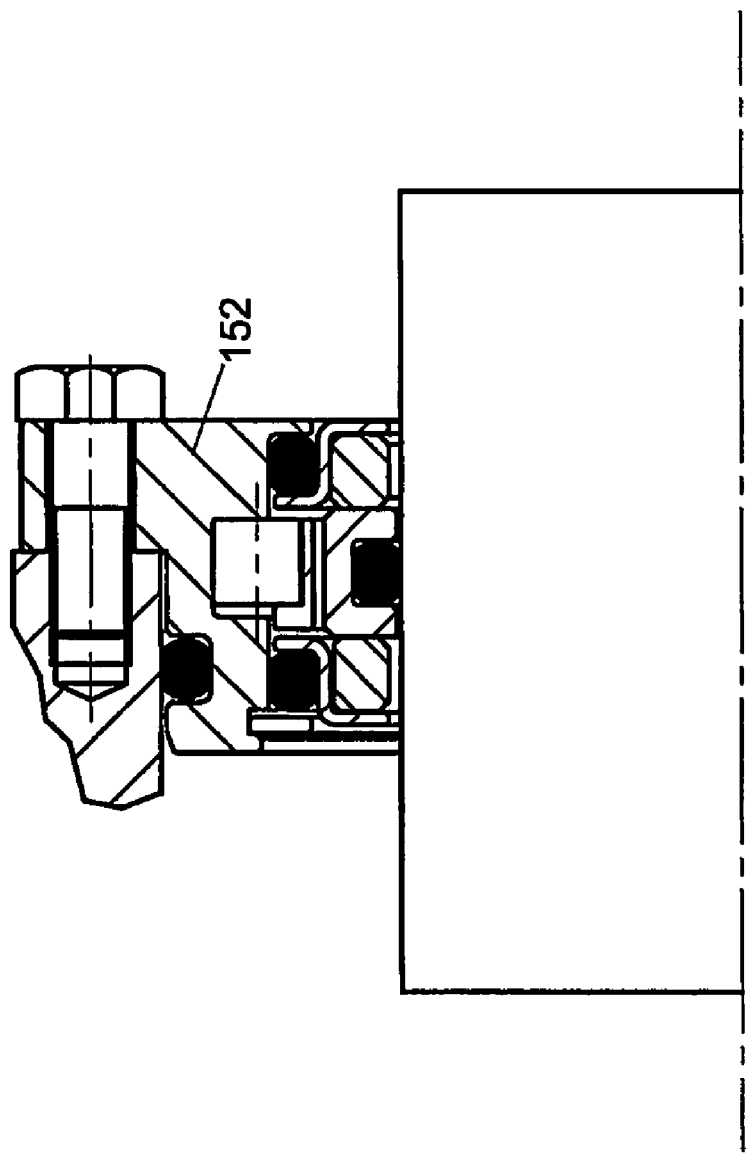
FIG. 11 is a partial longitudinal cross-section through an eleventh embodiment of a bearing protector of the invention.

In the alternative embodiment shown in FIG. 11, the bearing protector may be provided with an integral gland plate 152.

Figure 12:
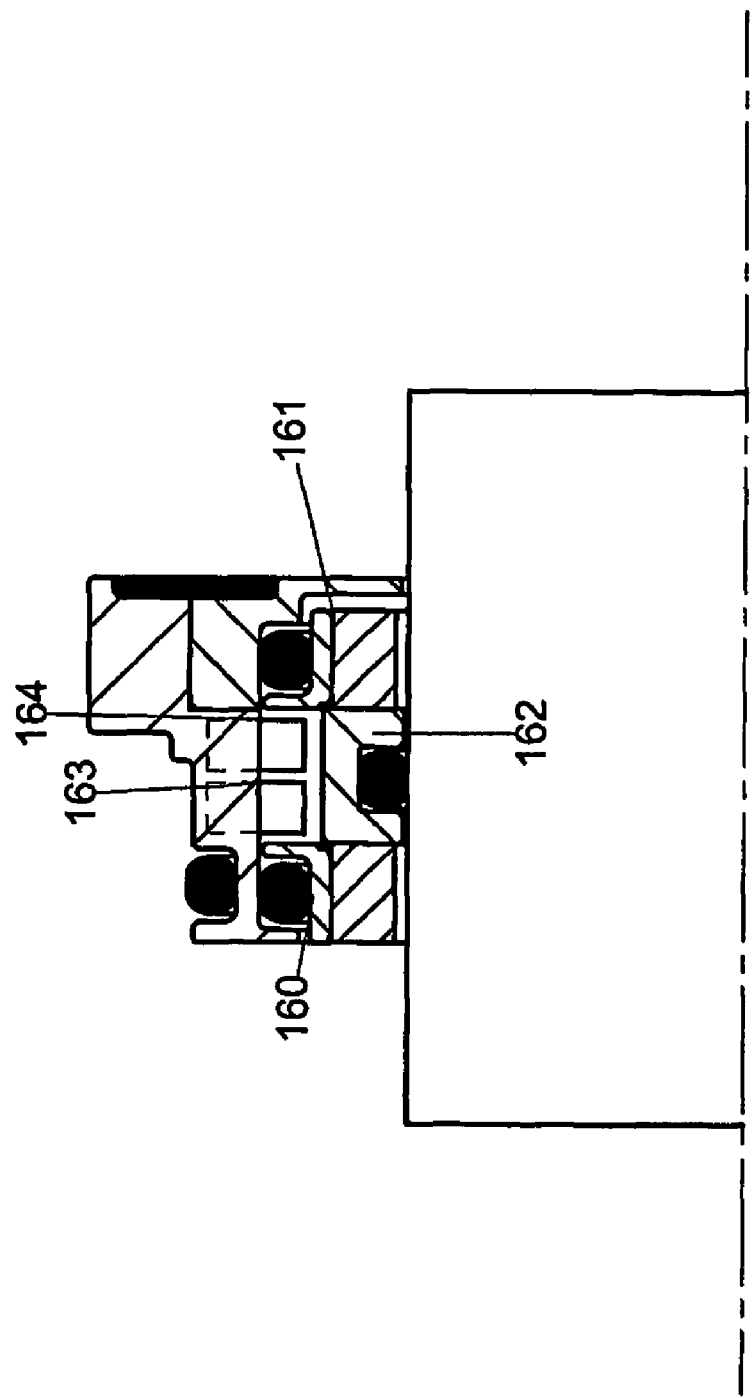
FIG. 12 is a partial longitudinal cross-section through a twelfth embodiment of a bearing protector of the invention.

Referring to FIG. 12 of the accompany drawings, a twelfth embodiment of a bearing protector of the invention is provided with two separate, magnetically attracting stationary seal face assemblies 160 and 161. Each stationary seal face assembly 160, 161 is attracted to the rotary seal face and magnets 163 and 164 respectively. Magnet 163 attracts stationary seal face assembly 160 and magnet 164 attracts stationary seal face assembly 161. Thus each seal face works independently with regard to the other seal face.

Figure 13:
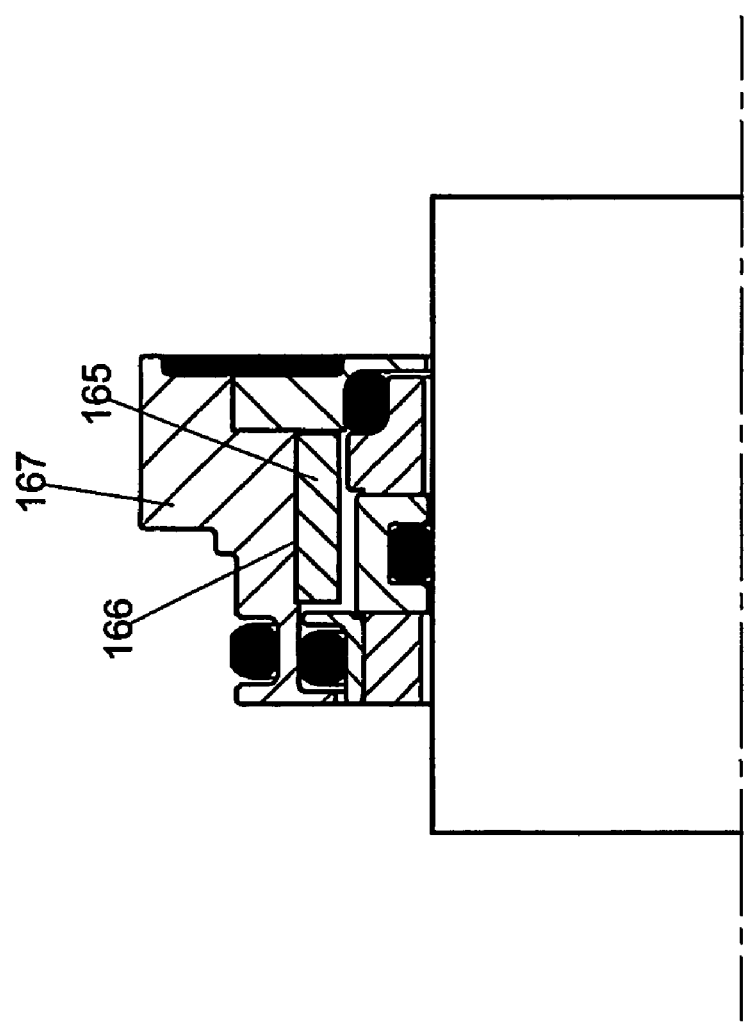
FIG. 13 is a partial longitudinal cross-section through a thirteenth of a bearing protector of the invention.

Referring to FIG. 13 of the accompanying drawings, a thirteenth embodiment of a bearing protector of the invention is similar to that shown in FIG. 5B and has a full cylindrical magnet 165 which locates on the innermost radial portion 166 of housing 167, providing an annular exposed magnet. This arrangement is an alternative to the use of multiple smaller cylindrical bar magnets as shown in earlier drawings.

Referring to FIGS. 14a and 14b of the accompanying drawings, the fourteenth embodiment of the invention is in the form of a single seal bearing protector fitted to the outboard end of a cartridge seal. At least one magnet 172 attracts seal face assembly 173 into contact with the rotary seal face 174. The opposite axial side of the rotary seal face 174 is supported by an elastomer 175 adjacent to a clamp ring 176. Fluid 177 is sealed by the sliding interface 178 between the rotary seal face 174 and the stationary seal face 173. The rotary seal face 174 is rotationally driven by either the radial squeeze on elastomer 175 to cartridge sleeve 179 or, as illustrated in FIG. 14B, a drive mechanism which protrudes into a slot 181 located in rotary seal face 174.

Figure 14:
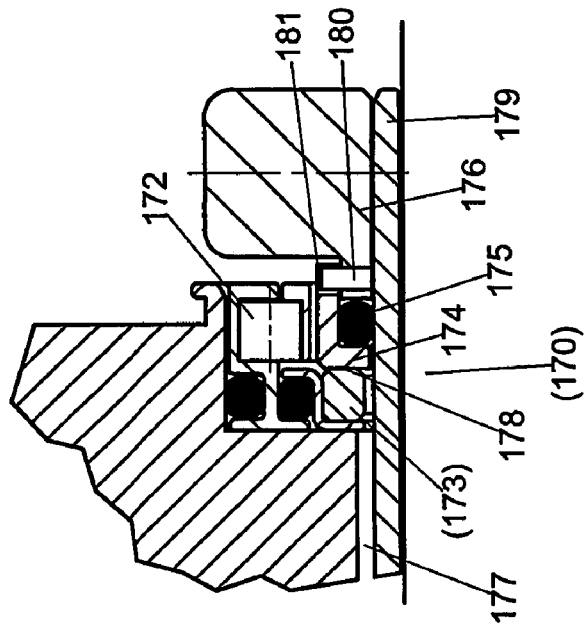
FIG. 14A shows a fourteenth embodiment of the invention in the form of a single seal bearing protector fitted to the outboard end of a cartridge seal.
FIG. 14B shows an enlargement of that part of FIG. 14A within the broken circle.
Figure 14:
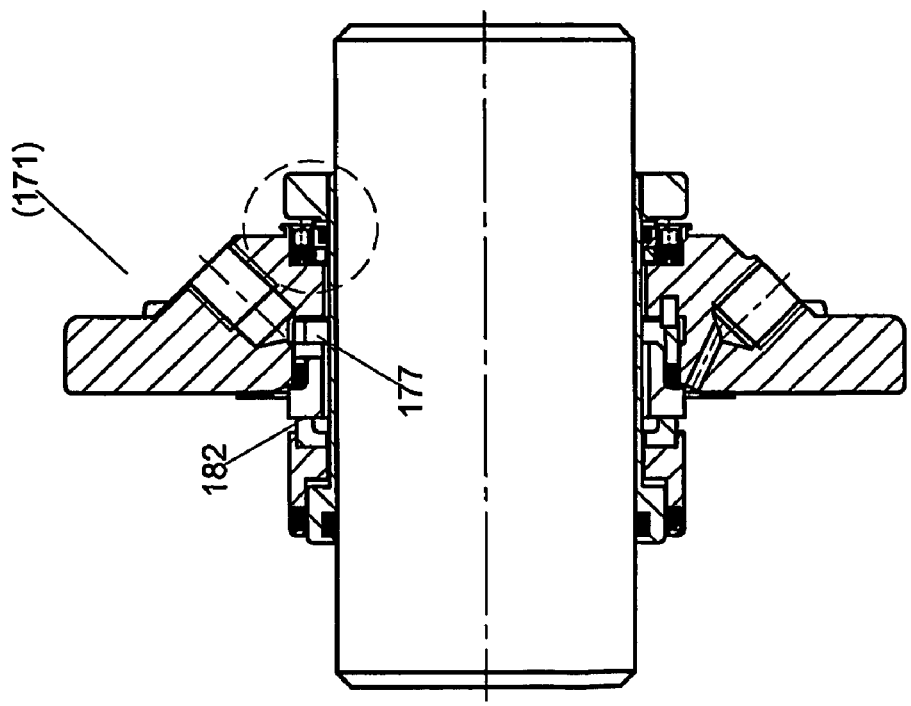

The arrangement shown in FIG. 14 illustrates the containment of a barrier fluid 177 by cartridge seal 171 which fills the barrier cavity between the inboard sliding surface 182 and the outboard sliding surface 178.

Figure 15:
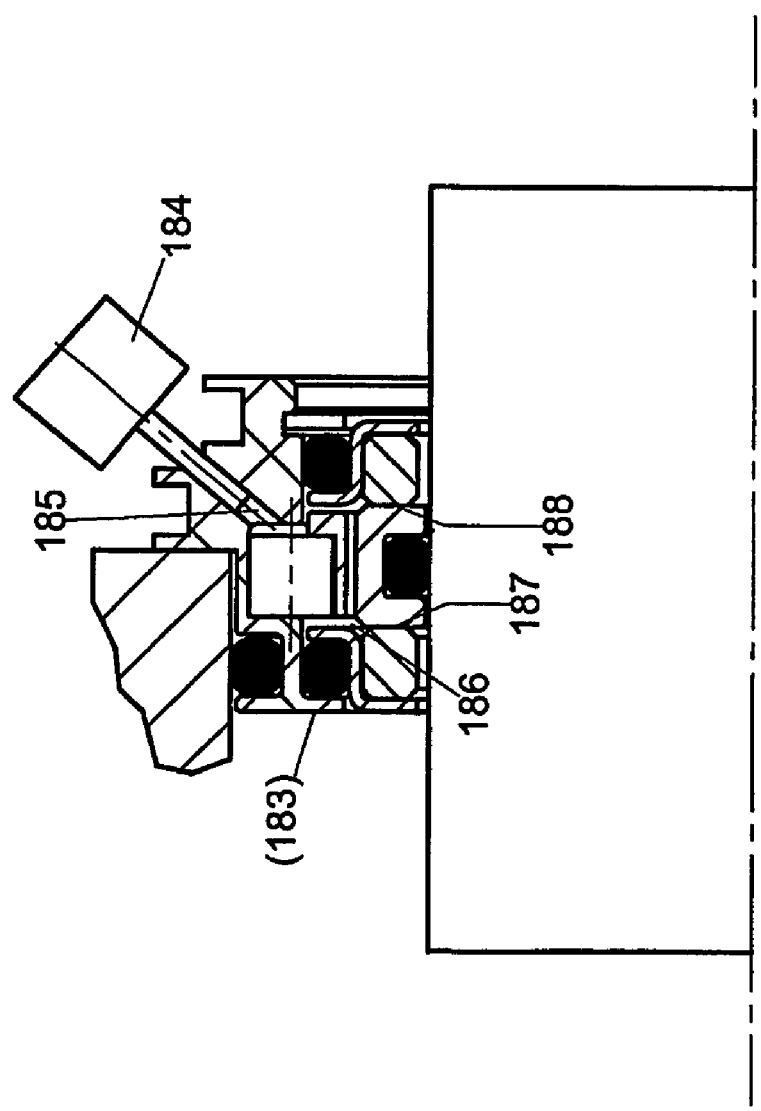
FIG. 15 is a partial longitudinal cross-section through a fifteenth embodiment of a bearing protector of the invention.

Referring to FIG. 15 of the accompanying drawings, a fifteenth embodiment of the bearing protector of the invention has an external lubrication facility 184 which provides fluid 185 to the bearing protector chamber 186. The external lubrication of facility 184 is preferably a no-maintenance pot filled with a fluid such as oil or grease, fluid being fed to the chamber 186 when it is used by the sliding seal face surfaces 187 and 188.

Figure 16:
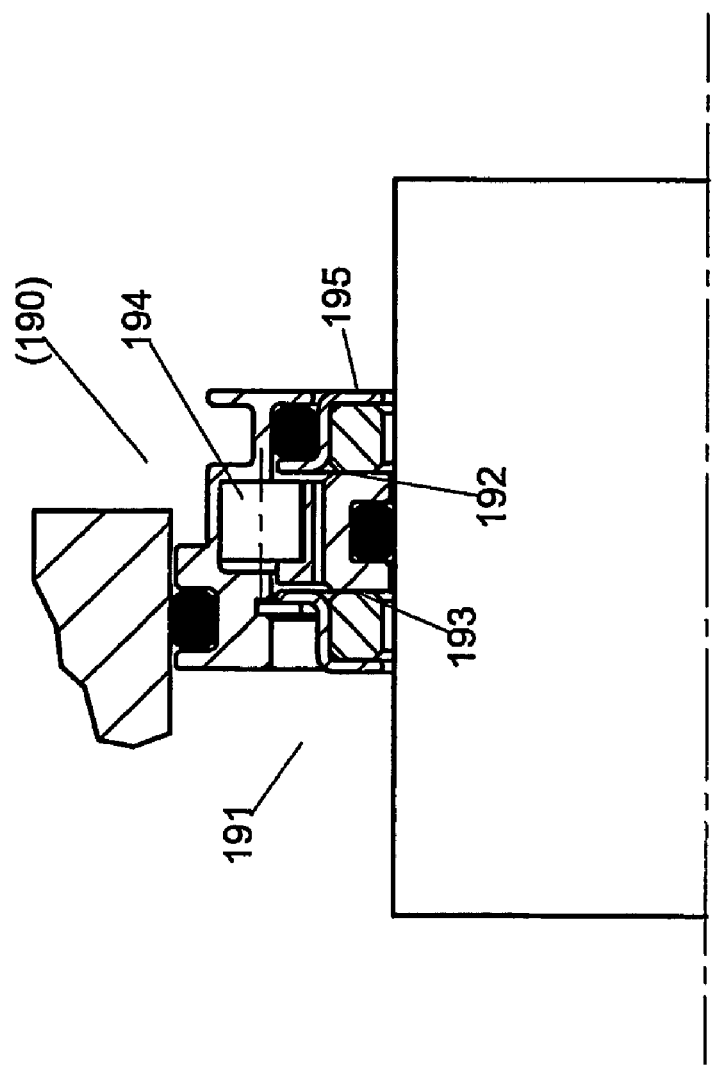
FIG. 16 is a partial longitudinal cross-section through a sixteenth embodiment of a bearing protector of the invention.

Referring to FIG. 16 of the accompanying drawings, a sixteenth embodiment of a bearing protector of the invention is similar to that shown in FIG. 6AA except that the inboard length of the bearing protector 190 has been shortened by the removal of the stationary seal face elastomer. This allows the bearing protector 190 to operate as a single seal since fluid 191 contacts the outermost radial surface of the outboard sliding surface 192. Fluid 191 thereby lubricates and cools sliding surface 192 in addition to lubricating and cooling sliding surface 193. Even though the bearing protector 190 is acting as a single seal, the main advantage of the invention is retained since the magnetic force is not subjected to two counter rotating surfaces which may generate sparks or have another undesirable effect. As clearly shown in FIG. 16, the force from the stationary magnet 194 is attracting stationary seal face assembly 195.

Figure 17:
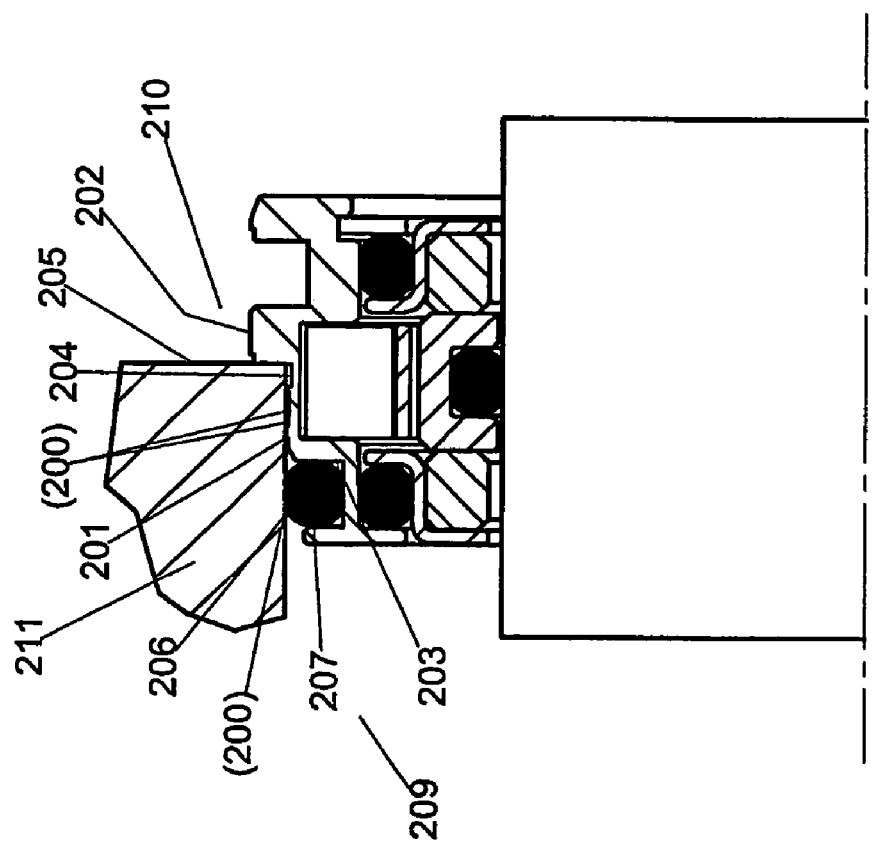
FIG. 17 is a partial longitudinal cross-section through a seventeenth embodiment of a bearing protector of the invention.

Referring to FIG. 17 of the accompanying drawings, there is illustrated a seventeenth embodiment of a bearing protector of the invention. In this embodiment, the bearing protector is provided with a radial indentation 201 in the outer surface of its outer body 202. This radial indentation 201 connects radial surface 203 of the outer body 202 to the axial surface 204 of radial shoulder 205. Radial surface 203 lies adjacent to elastomer 206 positioned in outer radial groove 207. The elastomer 206 has a light radial squeeze and prevents fluid, at low pressure, from exiting or entering the sealed bearing cavity. However, above a certain pressure the elastomer 206 cannot hold the fluid pressure any longer. At this point pressurised fluid 209 weeps past elastomer 206 and into the radial indentation groove 201. As the radial indentation groove 201 is connected to the atmosphere side 210 of the unit, fluid pressure is relieved to atmosphere.

This relief of pressure prevents the bearing protector outer housing 202 from being pressed out of the bearing chamber housing 211.

Figure 18:
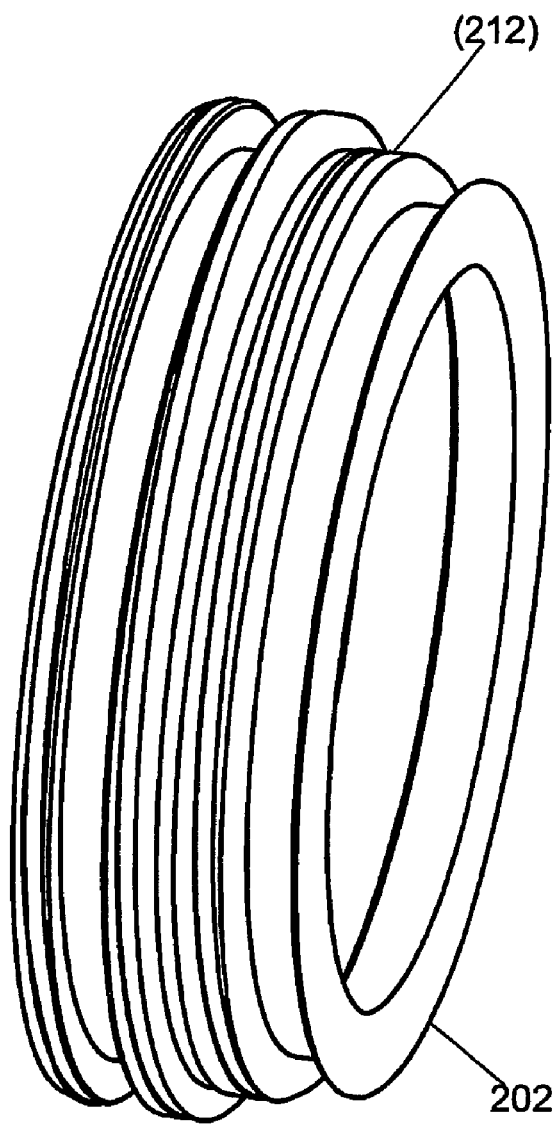
FIG. 18 is an isometric view of an eighteenth embodiment of a bearing protector of the invention.

Referring to FIG. 18 of the accompanying drawings, an eighteenth embodiment of a bearing protector of the invention has an outer body 202 which has a spiral radial indentation 212 connecting one axial surface to another. In other embodiments, the spiral form would be replaced by another radial indentation connecting the two axial surfaces together.

In certain applications, for example, a 100 kW variable speed drive electric motor, a current can be produced which earths from the rotating shaft to the frame of the motor. This creates a spark through the bearing. As the bearing elements, balls or rollers, act in a point or line contact with the outer and inner bearing races, the spark creates a pitting effect in these elements significantly reducing their life expectancy. Accordingly, it would be desirable to utilise an arrangement which effectively earths between the rotating element and stationary element, thereby removing the need for the spark to travel through the bearing elements.

Figure 19:
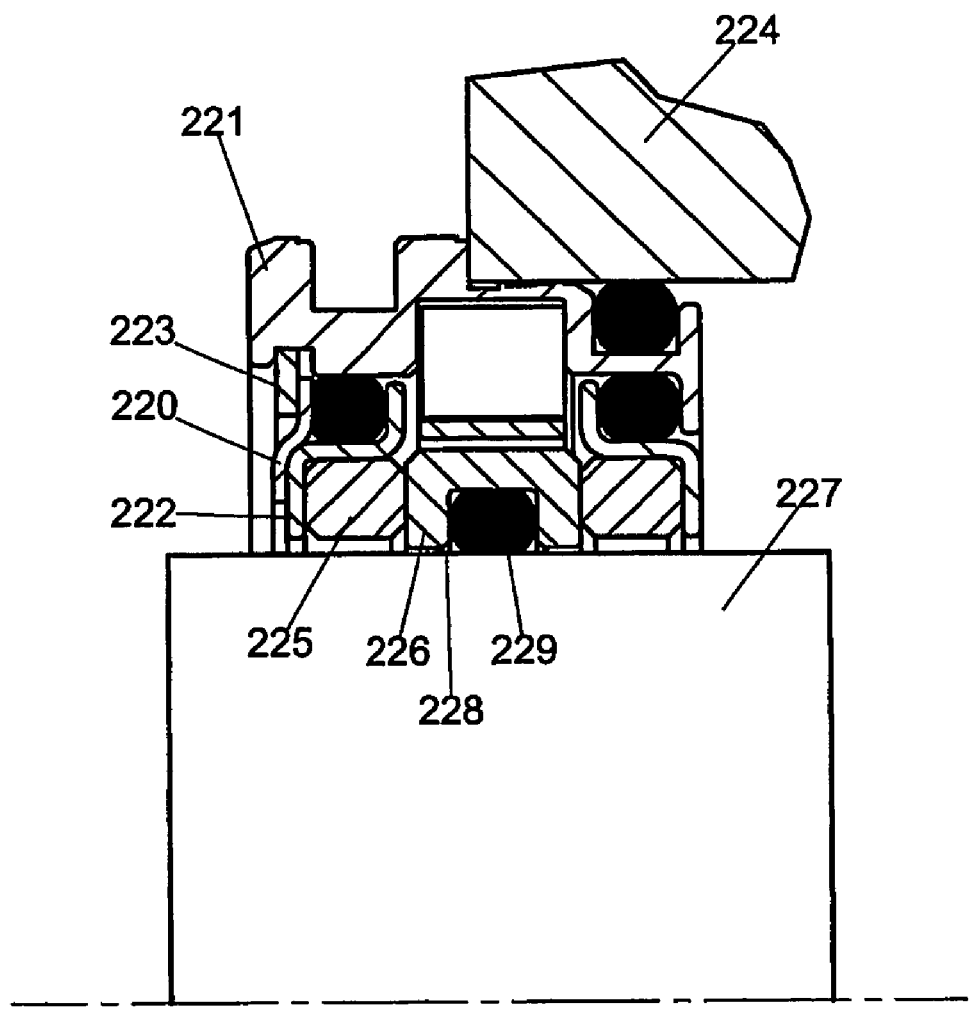
FIG. 19 is a partial cross-section of a nineteenth embodiment of a bearing protector of the invention.

Referring to FIG. 19 of the accompanying drawings, a nineteenth embodiment of a bearing protector of the invention has an earthing/grounding strap 220 which positively connects the outer housing 221 to the stationary seal face holder 222 via circlip 223. Any electrical current is transferred from the bearing housing 224 to the outer housing 221 and into circlip 223. From circlip 223 the current passes into the earthing strap 220 which is manufactured from a conductive material. The earthing strap 220 is in contact with the stationary seal face holder 222 which in turn contacts seal face insert 225, the latter being made of carbon or other suitable conductive material. The electrical current then passes into the rotary seal face 226 and thence into the shaft 227.

As indicated in FIG. 19, there may be a small radial clearance 228 between the rotary face 226 and the shaft 227. In such a case, the electrical current may arc the radial gap in a controlled manner since both rotary seal face 226 and shaft 227 rotate together. In an alternative embodiment, rotary elastomer 229 is made of a conductive material thereby allowing the electrical current to travel between the rotary seal face 226 into shaft 227 via elastomer 229.

Figure 20:
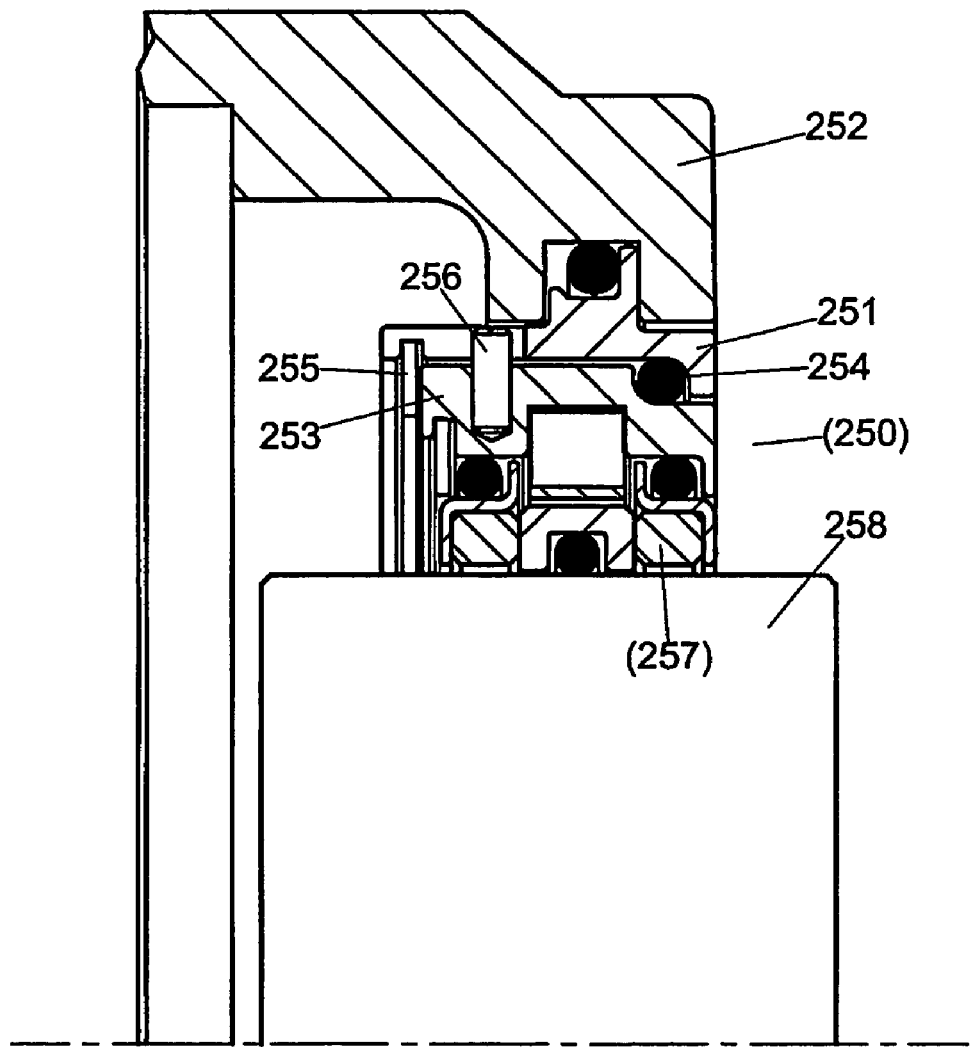
FIG. 20 is a partial cross-section of a twentieth embodiment of a bearing protector of the invention.

In certain applications, for example, a pillar block assembly, the shaft of a rotating piece of equipment is required to angularly misalign. It is therefore desirable to utilise a bearing protector which accommodates such angular misalignment Referring to FIG. 20 of the accompanying drawings, another example of a bearing protector 250 of the invention is shown mounted in a self-aligning housing 251. Housing 251 locates in the bearing frame housing 252. Housing 251 is radially displaced relative to the outer housing 253 of the bearing protector 250. Housing elastomer 254 axially connects outer housing 253 with self-aligning housing 251. The bearing protector 250 is prevented from axially falling apart by circlip 255. Anti-rotation pin 256 rotationally connects outer housing 253 with self-aligning housing 251. This arrangement allows the bearing protector to angularly flex with the shaft 258 while the self-aligning 251 remains angularly set by the bearing frame housing 252. The pivot point is adjacent to elastomer 254.

Figure 21:
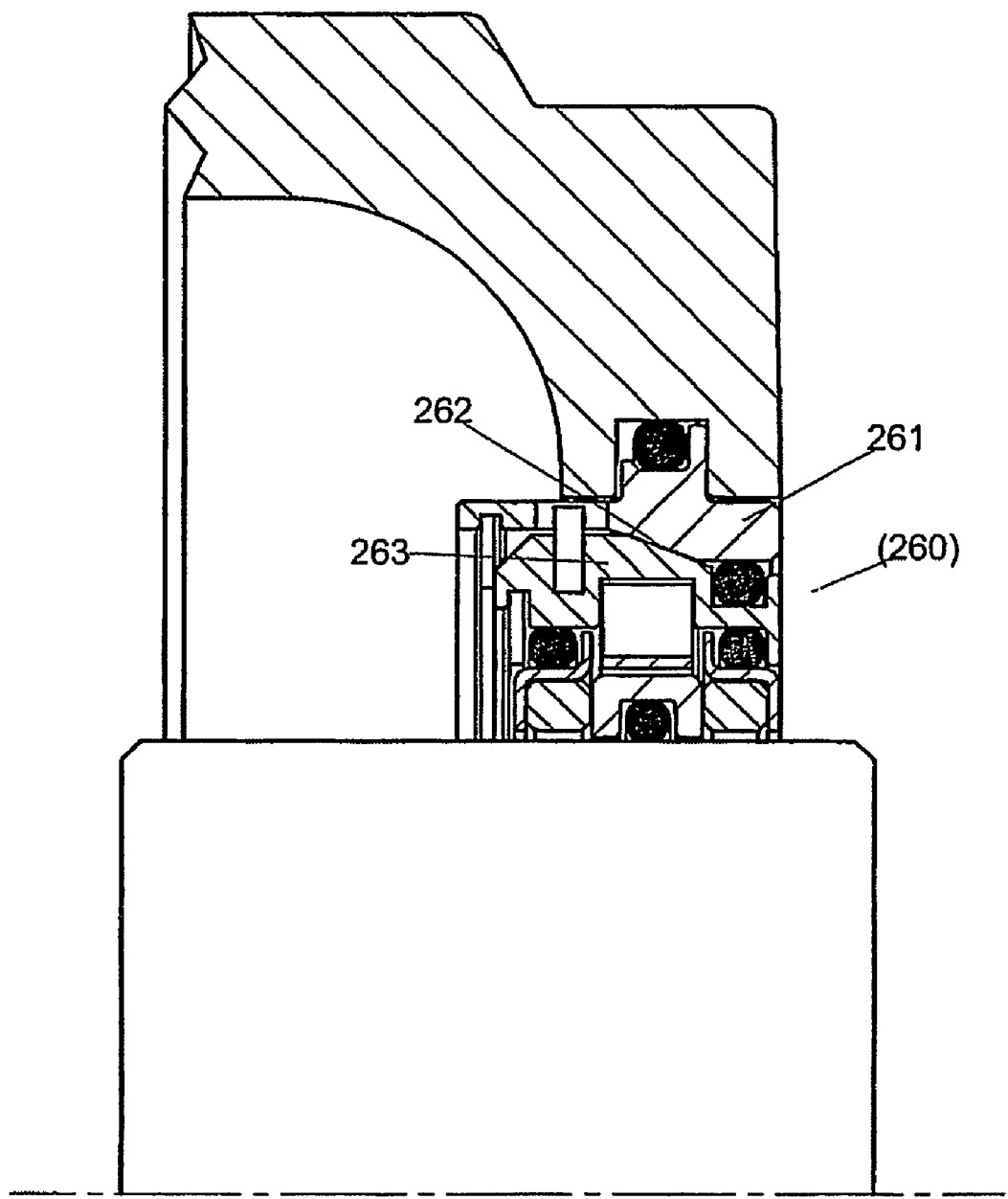
FIG. 21 is a partial cross-section of a twenty first embodiment of a bearing protector of the invention.

Referring to FIG. 21 of the accompanying drawings, there is illustrated a bearing protector 260 of the invention mounted in an alternative self-aligning housing 261. The assembly pivot point is formed from the two spherical surfaces 262 in both the self-aligning housing 261 and the outer housing 263.

It will be appreciated that self-alignment that can be achieved in a number of different ways in addition to those described above. For instance the arrangement may include one or more tapered surfaces, one or more spherical surfaces or any combination of spherical and tapered surfaces.

Figure 22:
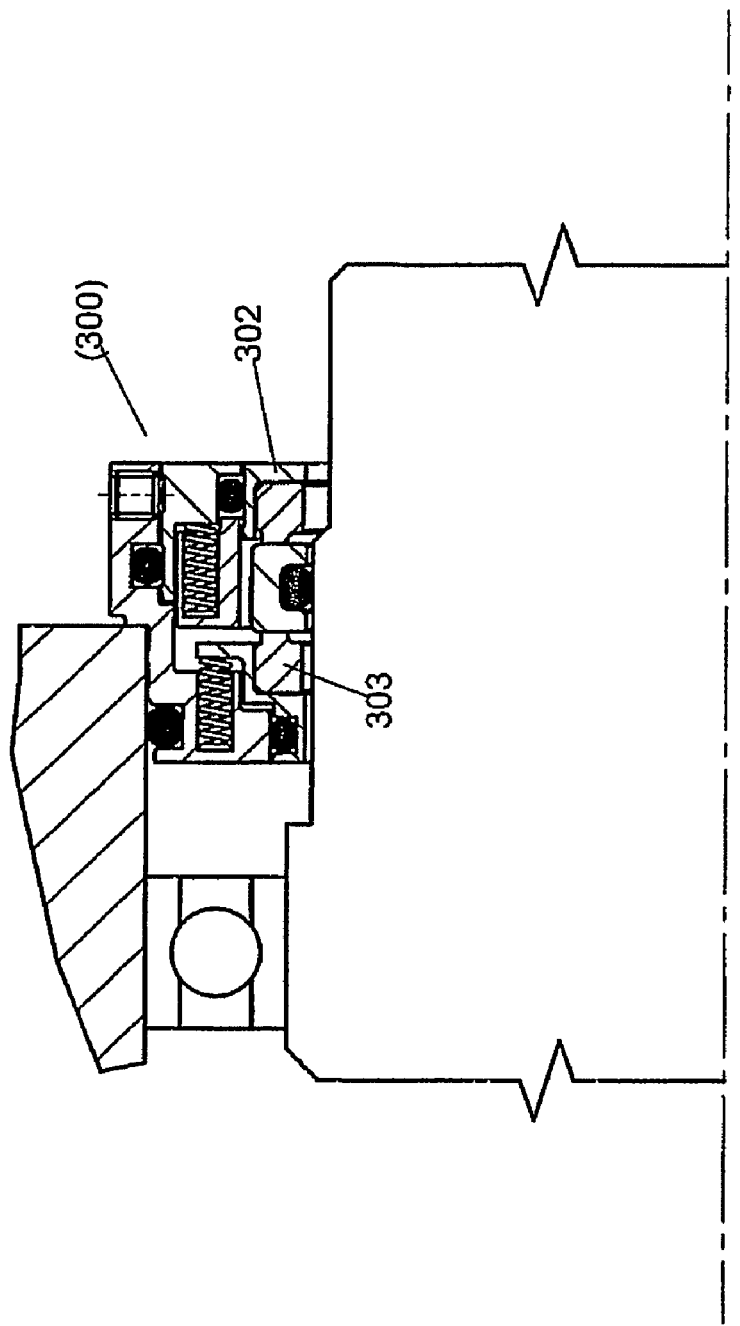
FIG. 22 shows the bearing protector of FIG. 21 in an alternative partial cross-section.
Figure 23:
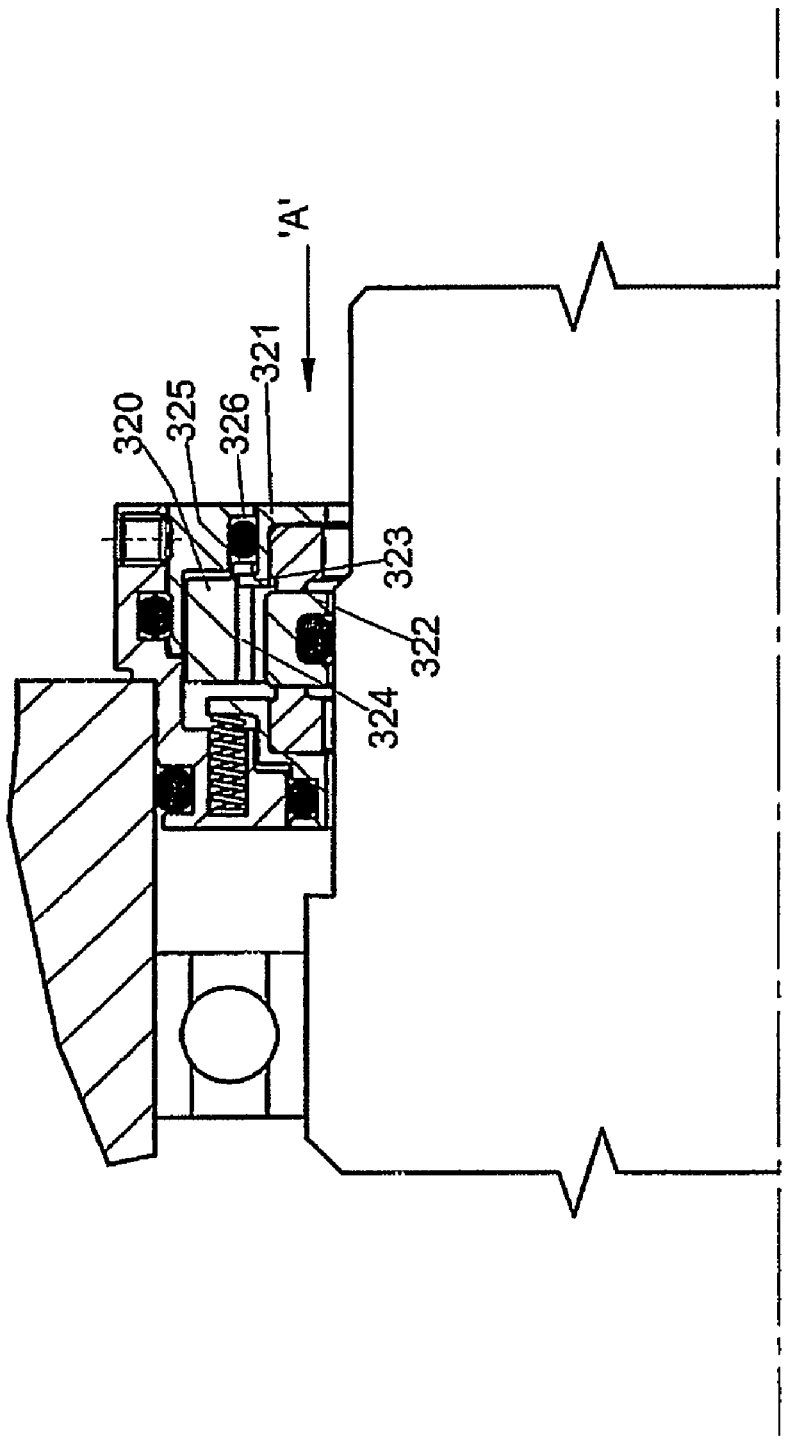
FIG. 23 corresponds to FIG. 22 and illustrates the mechanism for biasing the stationary seal face to the rotary seal face.

Referring to FIG. 22 of the accompanying drawings, another embodiment of a bearing protector 300 of the invention has stationary seal faces 302, 303 which are energised by one or more springs 301. FIG. 23 corresponds to FIG. 22 and shows the mechanism which allows the spring plate 320 axially to attract the outboard stationary seal face 321 to the rotary seal face 322 in the direction of arrow A.

Stationary seal face 321 includes one or more radially extending lugs 323 which engage in a slot 324 in spring plate 320. The slots 324 axially extend to the side opposite the stationary seal face 321 but terminate before breaking through the opposite axial face of spring plate 320. This arrangement provides a solid, uninterrupted axial face 325 which lies adjacent stationary elastomer 326.

Figure 24:
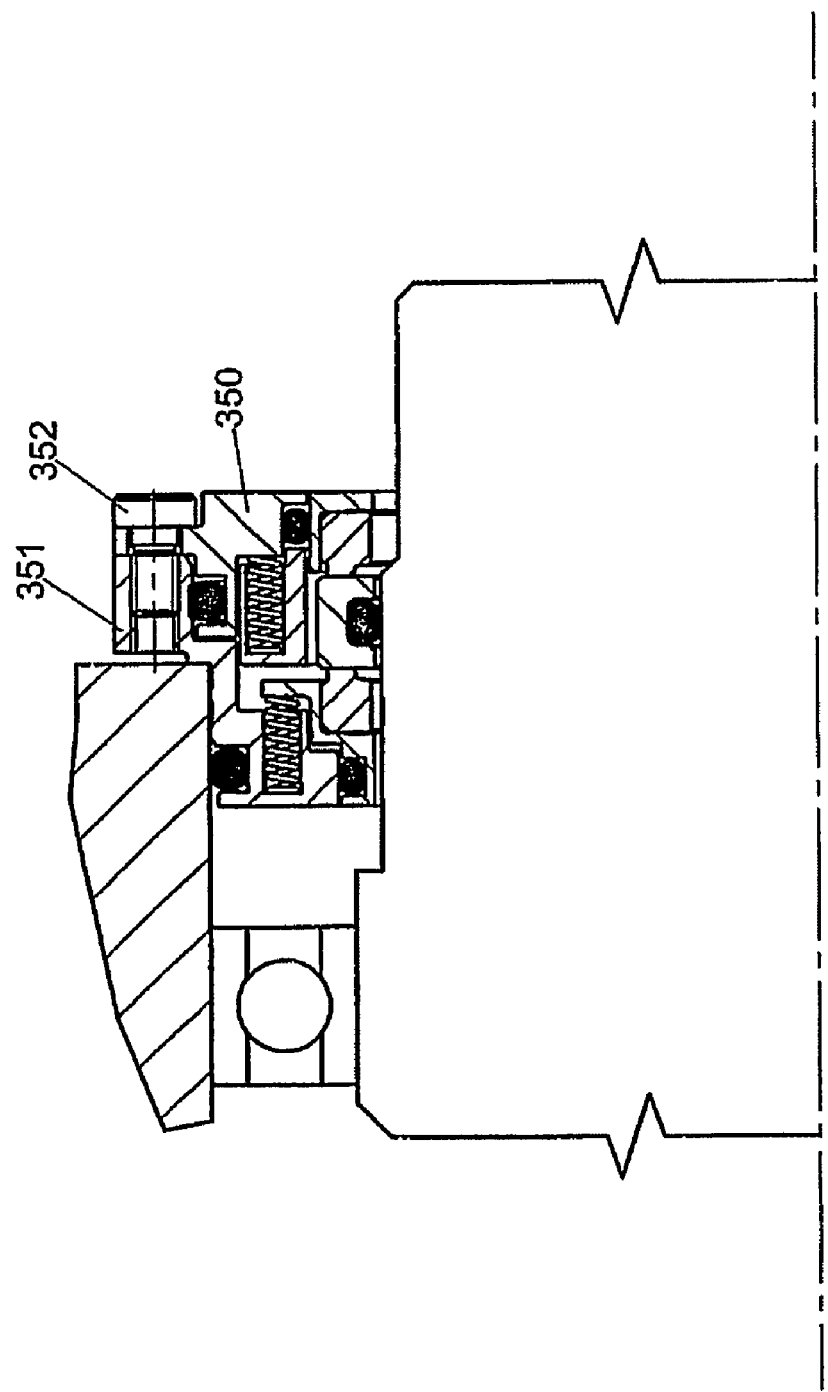
FIG. 24 is a partial cross-section through a twenty second embodiment of a bearing protector of the invention.

Referring to FIG. 24 of the accompanying drawings, there is illustrated an alternative embodiment, similar to that of FIG. 22, in which the end plate 350 is secured to the outer housing 351 by one or more securing elements 352.

Figure 25:
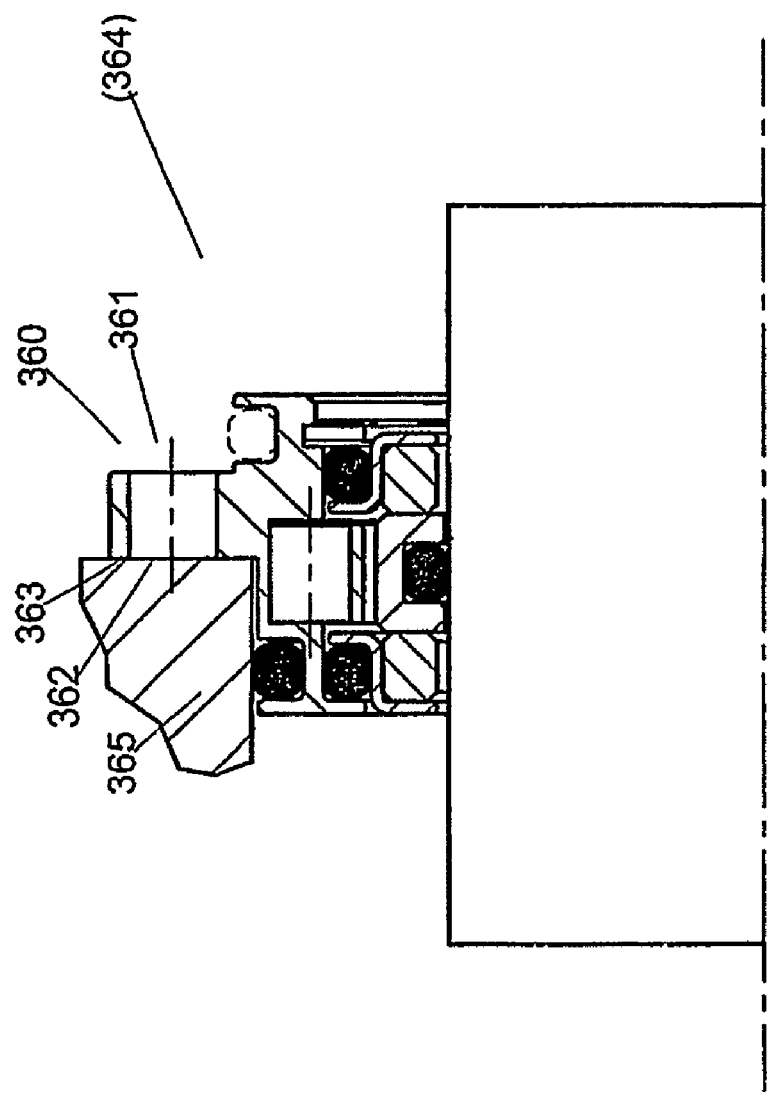
FIG. 25 is a partial longitudinal cross-section through a twenty fifth embodiment of a bearing protector of the invention.

FIG. 25 illustrates an alternative design of the invention in which the outer housing 360 contains at least one magnet 361.

Magnet 361 is radially contained and secured in the outer housing with axial side 362 being axially in line with axial shoulder 363 of outer housing 360. When the bearing protector 364 is fitted to the bearing housing 365, the magnet 361 non-permanently attracts the outer housing 360 to the bearing housing 365.

Preferably, a number of magnets 361 are circumferentially spaced around the outer housing 360 with the result that the attraction between the outer housing 360 and the bearing housing 365 is large enough to withstand any force acting to displace the outer housing 360. This embodiment of the invention therefore provides a reparable and re-usable outer housing 360 since it does not need to be a radial interference fit with the bearing housing 365. Magnets 361 may also be positioned and secured radially in outer housing 360 providing an attraction force on the radial portion of bearing housing 365.

Figure 26:
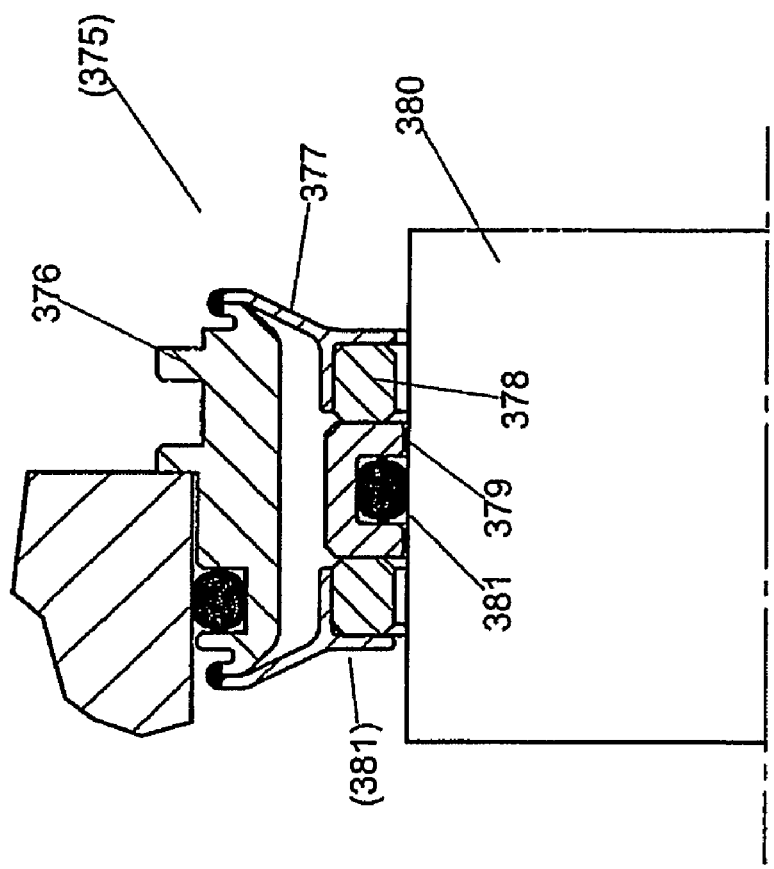
FIG. 26 is a partial longitudinal cross-section through a twenty sixth embodiment of a bearing protector of the invention.
Figure 27:
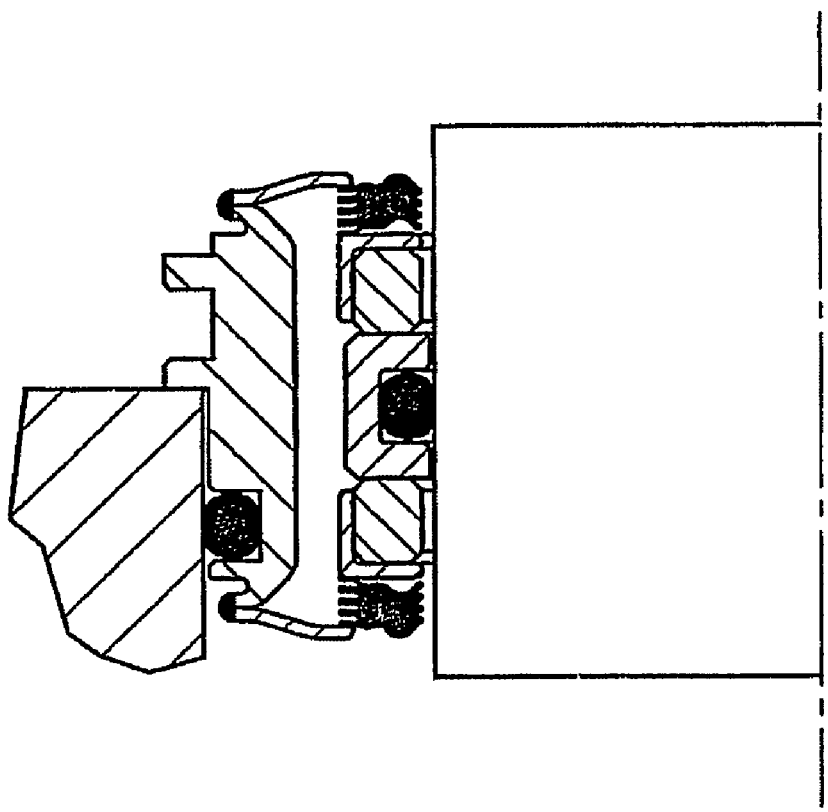
FIG. 27 is a partial longitudinal cross-section through a twenty seventh embodiment of a bearing protector of the invention.

Referring to FIG. 26 of the accompanying drawings, another embodiment of the present invention is a bearing protector 375 in which the outer housing 376 is connected, for instance by welding, to at least one bellows-like member 377. Member 377 is shown as a single bellows span in FIG. 376 but it may alternatively be in the form of a stack comprising a number of bellows spans welded on the outer circumference in such a manner as to provide a spring-like member as illustrated in FIG. 27.

In FIG. 26, the bellows 377 is connected to an axially floating seal face 378 which is not rotatable. Bellows 377 provides an axial biasing of axial floating seal face 378 to the axial stationary seal face 379. The axial stationary seal face 379 is sealed to the shaft 380 by elastomer 381 which also provides the rotational drive from the shaft 380 to the seal face 381.

The axially floating seal face 378 and bellows 377 are symmetrical about the perpendicular centre line of the rotary seal face 379 with respect to the shaft 380. FIG. 26 shows an inboard axially floating seal assembly 381 as previously described.

Figure 28:
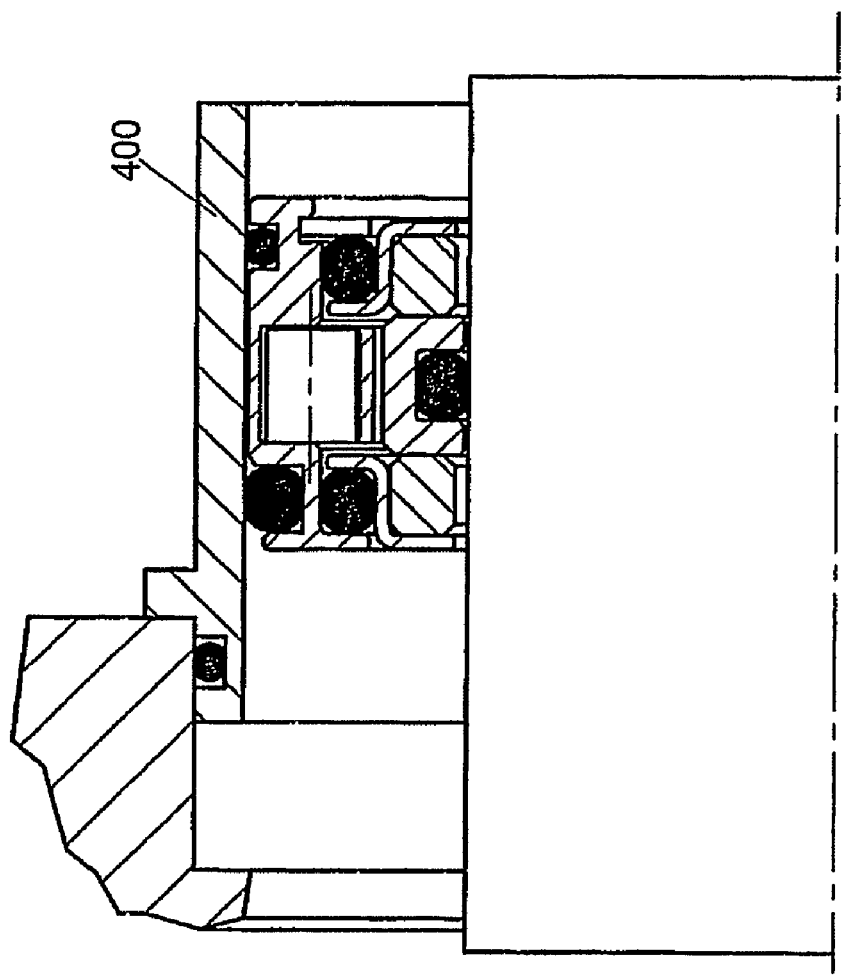
FIG. 28 is a partial longitudinal cross-section through a twenty eighth embodiment of a bearing protector of the invention.

Any amount of axial movement can be accommodated in a bearing protector of the invention, if it is mounted in a sliding housing 400 as shown in FIG. 28. This arrangement is particularly advantageous where shaft movement is excessive because of physical and/or thermal expansion considerations.

Some types of rotating equipment have large shaft diameters. The equipment can take many hours, days or weeks to strip down and replace failed bearing protectors.

In such applications it is desirable that the bearing protector can be installed in situ without stripping down the rotating equipment.

Figure 29:
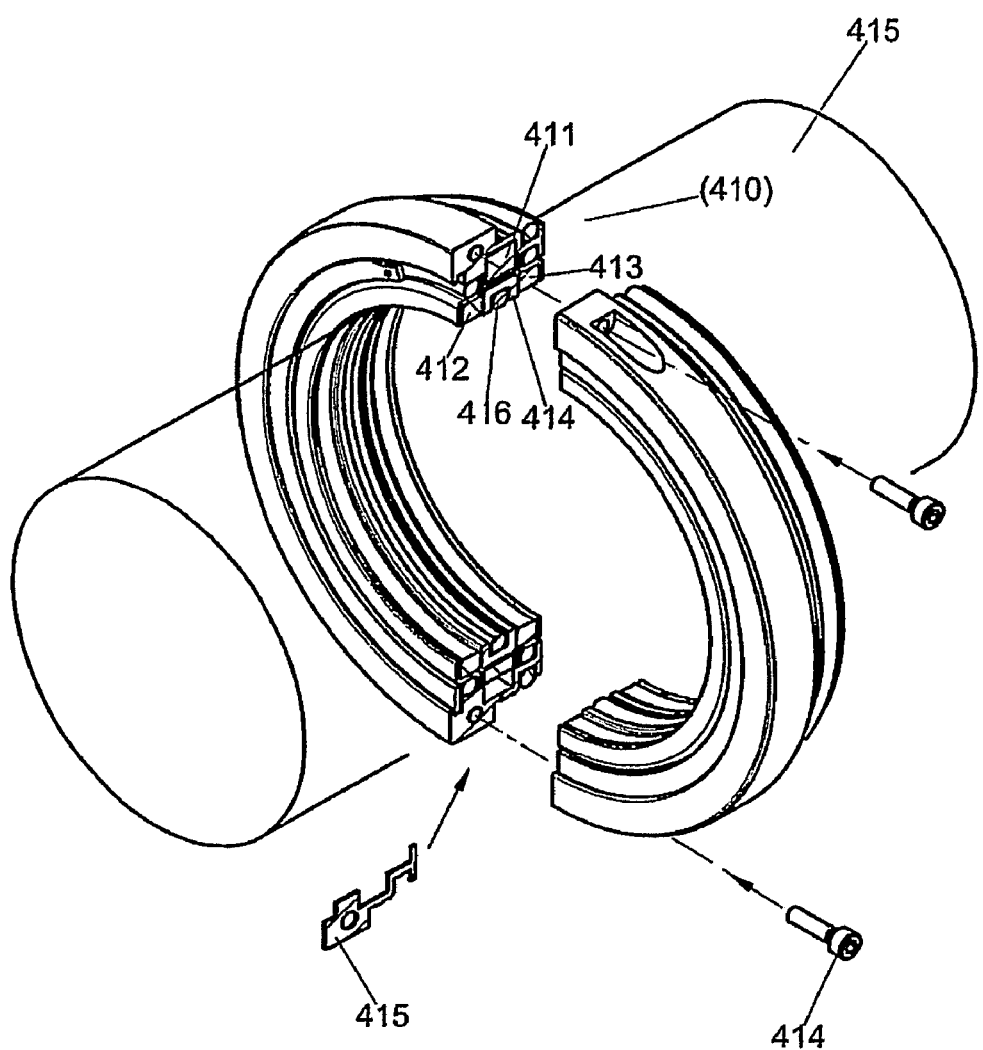
FIG. 29 is a partial longitudinal cross-section through a twenty ninth embodiment of a bearing protector of the invention.

Referring to FIG. 29, there is illustrated an axially split double seal bearing protector 410 with magnets 411 attracting the two axially floating seal faces 412, 413 towards the common axially stationary but rotary seal face 414. Rotary seal face 414 is rotationally driven by shaft 415 via rotary elastomer 416.

The two halves of the assembly are connected together by a suitable securing device, such as one or more cap screws 414a. Positioned between the two halves is gasket 415. Alternatively, the two halves can be lapped together so that they are flat and thus form an integral sealing surface.

The two halves of the bearing protector can be glued together with a suitable adhesive and/or sealant during the installation of the unit on a rotating piece of equipment. Thereafter, if considered desirable, the two halves can be mechanically secured and held together by a suitable fastener such as a jubilee clip, a circlip, a split ring, a tie-wrap and/or a series of screws.

This embodiment of the invention is particularly advantageous as the installation on the rotating equipment is very simple and less time-consuming than non-split designs. Furthermore, bearing protection is typically a low duty application with zero process pressure and temperature. Accordingly, the simple securing together of the two halves of the bearing protector, including the elastomers, via a sealant or adhesive is both suitable and practical.

The invention claimed is:

1. A mechanical seal for sealing between a rotatable shaft and a stationary housing, the seal comprising an axially fixed, rotary seal face member for attachment to the shaft for rotation therewith and providing two axially separated and oppositely facing seal faces, first and second, axially floating, stationary seal face members arranged on axially opposite sides of said rotary seal face member and each having a seal face providing sliding contact with a respective seal face of the rotary seal face member, and means for magnetically biasing said floating seal face members towards said rotary seal face member, said axially floating seal face members and said biasing means being rotationally fixed relative to each other and said axially fixed seal face member being free to rotate relative to said axially floating seal face members, wherein said magnetically biasing means comprises at least one magnet, one end of the at least one magnet attracts said first axially floating seal face member and the other end of the at least one magnet attracts said second axially floating seal face member respectively towards said two axially separated and oppositely facing seal faces.

2. A mechanical seal according to claim 1 wherein said biasing means is mounted radially outwards of said seal face member.

3. A mechanical seal according to claim 1 wherein the seal includes a magnetically insulating member located between said biasing means and said axially fixed seal face member.

4. A mechanical seal according to claim 1 wherein the biasing means comprises two or more magnets circumferentially separated by a spacing element.

5. A mechanical seal according to claim 1 wherein said seal includes an outer housing which contains at least one magnet secured therein.

6. A mechanical seal according to claim 5 wherein the magnet is axially flush with a shoulder on the outer housing.

7. A mechanical seal according to claim 5 wherein said housing is provided with a radially extending hole connecting the outermost and innermost surfaces of the housing.

8. A bearing protector in the form of a mechanical seal as claimed in claim 1.

9. A mechanical seal according to claim 1, wherein each magnet is located radially outwards of said stationary seal face members.

* * * * *